US010843395B2

(12) United States Patent
Frerichs et al.

(10) Patent No.: US 10,843,395 B2
(45) Date of Patent: Nov. 24, 2020

(54) MULTI-LAYER INJECTION MOLDED CONTAINER

(71) Applicant: Gateway Plastics, Inc., Mequon, WI (US)

(72) Inventors: Joel R. Frerichs, Big Bend, WI (US); Brian W. Elflein, Wauwatosa, WI (US); Joshua J. Eastman, Jackson, WI (US)

(73) Assignee: Gateway Plastics, Inc., Mequon, WI (US)

( * ) Notice: Subject to any disclaimer, the term of this patent is extended or adjusted under 35 U.S.C. 154(b) by 0 days.

(21) Appl. No.: 16/695,587

(22) Filed: Nov. 26, 2019

(65) Prior Publication Data

US 2020/0094457 A1     Mar. 26, 2020

Related U.S. Application Data

(62) Division of application No. 15/819,999, filed on Nov. 21, 2017.

(51) Int. Cl.
*B29C 45/26*     (2006.01)
*B29C 65/00*     (2006.01)
(Continued)

(52) U.S. Cl.
CPC ........ *B29C 45/2606* (2013.01); *B29C 45/162* (2013.01); *B29C 45/164* (2013.01);
(Continued)

(58) Field of Classification Search
CPC . B29C 45/2606; B29C 45/1642; B29C 65/08; B29C 66/612; B29C 66/72341;
(Continued)

(56) References Cited

U.S. PATENT DOCUMENTS 4,426,014 A * 1/1984 Coltman, Jr. ........ B65D 43/022
215/DIG. 1
4,525,134 A    6/1985 McHenry et al.
(Continued)

FOREIGN PATENT DOCUMENTS

EP          0 555 620 A1     8/1993
JP          2011-051627 A     3/2011
(Continued)

OTHER PUBLICATIONS

Communication pursuant to Article 94(3) EPC for EP Application No. 17210327.7, dated Dec. 17, 2018, 5 pages.
(Continued)

*Primary Examiner* — Philip C Tucker
*Assistant Examiner* — Vicki Wu
(74) *Attorney, Agent, or Firm* — Foley & Lardner LLP

(57) ABSTRACT

A method for manufacturing an injection molded container includes operating an injection molding apparatus to inject one or more polymeric materials into a mold cavity to form a container. The container includes an energy director ring protruding from an inside surface of the container and extending circumferentially along the inside surface. The method includes welding a filter onto the inside surface by applying a welding force to the inside surface. The energy director ring causes the welding force to be concentrated at a location of the energy director ring, thereby forming a circumferential weld that secures the filter to the inside surface the location of the energy director ring.

8 Claims, 10 Drawing Sheets

(51) Int. Cl.

| | | |
|---|---|---|
| *B29C 45/76* | (2006.01) | |
| *B65D 1/40* | (2006.01) | |
| *B65D 1/28* | (2006.01) | |
| *B29C 65/08* | (2006.01) | |
| *B29C 45/16* | (2006.01) | |
| *B29L 31/00* | (2006.01) | |
| *B29K 67/00* | (2006.01) | |

(52) U.S. Cl.
CPC ........ *B29C 45/1642* (2013.01); *B29C 45/762* (2013.01); *B29C 45/766* (2013.01); *B29C 65/08* (2013.01); *B29C 66/112* (2013.01); *B29C 66/1122* (2013.01); *B29C 66/131* (2013.01); *B29C 66/30223* (2013.01); *B29C 66/5326* (2013.01); *B29C 66/53461* (2013.01); *B29C 66/545* (2013.01); *B29C 66/612* (2013.01); *B29C 66/72341* (2013.01); *B29C 66/7392* (2013.01); *B65D 1/28* (2013.01); *B65D 1/40* (2013.01); *B29C 45/7686* (2013.01); *B29C 2945/761* (2013.01); *B29C 2945/7629* (2013.01); *B29C 2945/76083* (2013.01); *B29C 2945/76464* (2013.01); *B29C 2945/76779* (2013.01); *B29C 2945/76859* (2013.01); *B29C 2945/76943* (2013.01); *B29K 2067/003* (2013.01); *B29K 2995/0068* (2013.01); *B29K 2995/0069* (2013.01); *B29L 2031/712* (2013.01); *B29L 2031/7164* (2013.01); *B32B 2323/10* (2013.01)

(58) Field of Classification Search
CPC . B29C 66/131; B29C 66/7392; B29C 45/766; B29C 66/30223; B29C 66/545; B29C 66/1122; B29C 66/5326; B29C 66/53461; B29C 45/162; B29C 45/164; B29C 45/762; B29C 45/7686; B29C 2945/76943; B29C 2945/76464; B29C 2945/761; B29C 2945/7629; B29C 2945/76083; B29C 2945/76779; B29C 2945/76859; B65D 1/28; B29L 2031/712; B29L 2031/7164; B29K 2995/0069; B29K 2067/003; B29K 2995/0068; B32B 2323/10
USPC ........................................................ 156/245
See application file for complete search history.

(56) References Cited

U.S. PATENT DOCUMENTS

| | | |
|---|---|---|
| 4,568,261 A | 2/1986 | McHenry et al. |
| 4,751,035 A | 6/1988 | McHenry et al. |
| 5,200,207 A | 4/1993 | Akselrud et al. |
| 5,223,275 A | 6/1993 | Gellert |
| 5,894,025 A | 4/1999 | Lee et al. |
| 5,914,138 A | 6/1999 | Swenson |
| 5,935,615 A | 8/1999 | Gellert et al. |
| 5,972,258 A | 10/1999 | Sicilia |
| 6,062,840 A | 5/2000 | Lee |
| 6,074,191 A | 6/2000 | Gellert et al. |
| 6,099,780 A | 8/2000 | Gellert |
| 6,187,241 B1 | 2/2001 | Swenson |
| 6,203,305 B1 | 3/2001 | Hofstetter et al. |
| 6,254,377 B1 | 7/2001 | Kazmer et al. |
| 6,261,075 B1 | 7/2001 | Lee et al. |
| 6,270,711 B1 | 8/2001 | Gellert et al. |
| 6,274,075 B1 | 8/2001 | Gellert et al. |
| 6,276,914 B1 | 8/2001 | Sicilia |
| 6,287,107 B1 | 9/2001 | Kazmer et al. |
| 6,294,122 B1 | 9/2001 | Moss et al. |
| 6,309,208 B1 | 10/2001 | Kazmer et al. |
| 6,322,344 B1 | 11/2001 | Maruyama et al. |
| 6,343,921 B1 | 2/2002 | Kazmer et al. |
| 6,343,922 B1 | 2/2002 | Kazmer et al. |
| 6,361,300 B1 | 3/2002 | Kazmer et al. |
| 6,419,870 B1 | 7/2002 | Lee et al. |
| 6,436,320 B1 | 8/2002 | Kazmer et al. |
| 6,440,350 B1 | 8/2002 | Gellert et al. |
| 6,464,909 B1 | 10/2002 | Kazmer et al. |
| 6,524,089 B1 | 2/2003 | Nightingale |
| 6,544,459 B2 | 4/2003 | Maruyama et al. |
| 6,585,505 B2 | 7/2003 | Kazmer et al. |
| 6,589,039 B1 | 7/2003 | Doughty et al. |
| 6,596,213 B2 | 7/2003 | Swenson |
| 6,599,116 B2 | 7/2003 | Lee et al. |
| 6,632,079 B1 | 10/2003 | Kazmer et al. |
| 6,648,622 B1 | 11/2003 | Gellert et al. |
| 6,649,101 B2 | 11/2003 | Kermet |
| 6,655,945 B1 | 12/2003 | Gellert et al. |
| 6,713,002 B2 | 3/2004 | Kazmer et al. |
| 6,722,531 B2 | 4/2004 | Matsuo et al. |
| 6,767,486 B2 | 7/2004 | Doughty et al. |
| 6,769,896 B2 | 8/2004 | Kazmer et al. |
| 6,824,379 B2 | 11/2004 | Doyle et al. |
| 6,908,581 B2 | 6/2005 | Sabin et al. |
| 6,974,556 B2 | 12/2005 | Bemis et al. |
| 7,029,268 B2 | 4/2006 | Doyle et al. |
| 7,175,419 B2 | 2/2007 | Babin |
| 7,207,796 B2 | 4/2007 | Rosner |
| 7,234,929 B2 | 6/2007 | Vasapoli et al. |
| 7,270,537 B2 | 9/2007 | Doyle et al. |
| 7,306,446 B2 | 12/2007 | Sabin et al. |
| 7,347,965 B2 | 3/2008 | Klaus |
| 7,419,625 B2 | 9/2008 | Vasapoli et al. |
| 7,458,795 B2 | 12/2008 | Seres et al. |
| 7,517,480 B2 | 4/2009 | Sabin et al. |
| 7,527,490 B2 | 5/2009 | Fairy |
| 7,569,169 B2 | 8/2009 | Vasapoli et al. |
| 7,597,828 B2 | 10/2009 | Doyle et al. |
| 7,713,046 B2 | 5/2010 | Fairy |
| 7,731,489 B2 | 6/2010 | Fairy |
| 7,901,601 B2 | 3/2011 | Vasapoli et al. |
| 8,016,581 B2 | 9/2011 | Vasapoli et al. |
| 8,435,434 B1 | 5/2013 | Swenson |
| 8,469,687 B2 | 6/2013 | Ten et al. |
| 8,491,290 B2 | 7/2013 | Swenson |
| 8,715,547 B2 | 5/2014 | Catoen et al. |
| 8,753,102 B2 | 6/2014 | Ten et al. |
| 8,757,998 B2 | 6/2014 | Ten et al. |
| 8,801,991 B2 | 8/2014 | Swenson |
| 8,815,359 B2 | 8/2014 | Mitadera |
| 8,940,202 B2 | 1/2015 | Catoen et al. |
| 9,073,246 B2 | 7/2015 | Ten et al. |
| 9,114,906 B2 | 8/2015 | Swenson |
| D738,733 S | 9/2015 | Janeczek |
| D739,248 S | 9/2015 | Janeczek |
| 9,138,926 B2 | 9/2015 | Johnson et al. |
| 9,186,833 B2 | 11/2015 | Catoen et al. |
| 9,221,204 B2 | 12/2015 | Swenson |
| 9,227,349 B2 | 1/2016 | Swenson |
| D749,422 S | 2/2016 | Janeczek |
| 9,358,711 B2 | 6/2016 | Joyner et al. |
| 9,409,333 B2 | 8/2016 | Swenson |
| D768,510 S | 10/2016 | Swenson et al. |
| 2002/0086086 A1 | 7/2002 | Doyle et al. |
| 2002/0121713 A1 | 9/2002 | Moss et al. |
| 2002/0190413 A1 | 12/2002 | Kazmer et al. |
| 2003/0113493 A1 | 6/2003 | Swenson |
| 2003/0124209 A1 | 7/2003 | Swenson |
| 2003/0155672 A1 | 8/2003 | Kazmer et al. |
| 2003/0160346 A1 | 8/2003 | Sabin et al. |
| 2003/0161977 A1 | 8/2003 | Sabin et al. |
| 2003/0181628 A1 | 9/2003 | Horn et al. |
| 2004/0047935 A1 | 3/2004 | Moss et al. |
| 2011/0291328 A1 | 12/2011 | Vasapoli et al. |
| 2012/0132558 A1 | 5/2012 | Busch et al. |
| 2012/0135171 A1 | 5/2012 | Swenson |
| 2013/0101696 A1 | 4/2013 | Swenson |
| 2013/0108834 A1 | 5/2013 | Sweetland |
| 2013/0207289 A1 | 8/2013 | Babin et al. |

(56) References Cited

U.S. PATENT DOCUMENTS

| | | |
|---|---|---|
| 2013/0340626 A1 | 12/2013 | Oh |
| 2014/0120282 A1 | 5/2014 | Kim et al. |
| 2014/0127433 A1 | 5/2014 | Arakawa et al. |
| 2014/0220167 A1 | 8/2014 | Mitadera |
| 2014/0272222 A1 | 9/2014 | Swenson |
| 2014/0306365 A1 | 10/2014 | Duffy et al. |
| 2014/0319725 A1 | 10/2014 | Duffy et al. |
| 2014/0327176 A1 | 11/2014 | Chiba et al. |
| 2014/0349081 A1 | 11/2014 | Swenson |
| 2014/0377414 A1* | 12/2014 | Walters .............. B65D 85/8043 426/115 |
| 2015/0083302 A1 | 3/2015 | Sawada et al. |
| 2015/0106912 A1 | 4/2015 | Brandon et al. |
| 2015/0209988 A1 | 7/2015 | Swenson |
| 2015/0283741 A1 | 10/2015 | Engelmann et al. |
| 2016/0046427 A1 | 2/2016 | Bellmore et al. |
| 2016/0107350 A1 | 4/2016 | Swenson |
| 2016/0167274 A1 | 6/2016 | Zipse et al. |
| 2016/0250789 A1 | 9/2016 | Swenson |
| 2017/0087754 A1 | 3/2017 | Swenson |

FOREIGN PATENT DOCUMENTS

| | | |
|---|---|---|
| WO | WO-02/081172 A1 | 10/2002 |
| WO | WO-2014/152008 A1 | 9/2014 |

OTHER PUBLICATIONS

Communication pursuant to Article 94(3) EPC for EP Application No. 17210327.7, dated Jun. 12, 2018, 6 pages.

European Search Report for EP Application No. 17210327.7, dated May 29, 2018, 6 pages.

* cited by examiner

MULTI-LAYER INJECTION MOLDED CONTAINER

CROSS-REFERENCE TO RELATED PATENT APPLICATION

This application is a division of U.S. patent application Ser. No. 15/819,999 filed Nov. 21, 2017, the entire disclosure of which is incorporated by reference herein.

BACKGROUND

The present disclosure relates generally to injection molded containers and more particularly to injection molded containers having a multi-layer wall structure. Injection molded containers are used for a variety of purposes such as storing food products, medicines, and other substances. Some injection molded containers are made of polymers such as polyethylene (PE), polyethylene terephthalate (PET), or polypropylene (PP). However, these materials are permeable to oxygen and other gasses which can cause degradation of the substance within the container.

To reduce detrimental gas permeation, some injection molded containers include a barrier layer made of a material substantially impermeable to gas (e.g., ethyl vinyl alcohol (EVOH)). The barrier material can be coinjected along with the other polymer(s) to form a container having a layered wall structure. Coinjection molding generally includes the injection of multiple polymeric materials into a single mold cavity or multiple mold cavities, either simultaneously or sequentially. However, it can be difficult to precisely control the position of the barrier layer during coinjection molding. Additionally, the barrier layer is susceptible to damage after the container is formed, which can greatly reduce the effectiveness of the barrier layer in preventing gas permeation.

SUMMARY

One implementation of the present disclosure is a coinjection molded multi-layer container including an inner layer, an outer layer, and a barrier layer. The inner layer includes a first polymeric material and forms an inside surface of the container. The outer layer includes the first polymeric material and forms an outside surface of the container. The barrier layer is located between the inner layer and the outer layer and includes a second polymeric material less permeable to gas than the first polymeric material. The barrier layer is biased toward the inside surface or the outside surface such that the inner layer and the outer layer have different thicknesses.

In some embodiments, the first polymeric material includes at least one of polyethylene (PE), polyethylene terephthalate (PET), polylactic acid (PLA), or polypropylene (PP). In some embodiments, the second polymeric material includes a polymer that opposes gas permeation. In some embodiments, the second polymeric material comprises at least one of ethyl vinyl alcohol (EVOH), MXD6 nylon, polyglycolide (PGA), or polyphenylenebenzobisoxazole (PBOH). Although several examples of suitable materials for the second polymeric material are provided, it should be understood that the second polymeric material is not limited to these examples. The second polymeric material can be any material that prevents, reduces, or opposes the permeation of oxygen or other gasses into the container.

In some embodiments, the barrier layer covers less than 95% of a surface area of the multi-layer container through which gas permeates into the multi-layer container. In some embodiments, the barrier layer has a thickness between approximately 3% and approximately 10% of a total thickness of the inner layer, the outer layer, and the barrier layer. In some embodiments, the barrier layer has a thickness of approximately 5% a total thickness of the inner layer, the outer layer, and the barrier layer. In some embodiments, the total thickness of the inner layer, the outer layer, and the barrier layer is approximately 0.015 inches.

In some embodiments, the barrier layer is biased toward the outside surface of the container such that the inner layer is thicker than the outer layer. In some embodiments, the inner layer has a thickness between 50% and 80% a total thickness of the inner layer, the outer layer, and the barrier layer. In some embodiments, the inner layer has a thickness of approximately 65% a total thickness of the inner layer, the outer layer, and the barrier layer. In some embodiments, the inner layer has a thickness between 0.008 inches and 0.012 inches. In some embodiments, the inner layer has a thickness between 0.095 inches and 0.010 inches.

In some embodiments, the outer layer has a thickness between 20% and 50% a total thickness of the inner layer, the outer layer, and the barrier layer. In some embodiments, the outer layer has a thickness of approximately 30% a total thickness of the inner layer, the outer layer, and the barrier layer. In some embodiments, the outer layer has a thickness between 0.003 inches and 0.008 inches. In some embodiments, the outer layer has a thickness between 0.004 inches and 0.0045 inches.

In some embodiments, the barrier layer is biased toward the inside surface of the container such that the outer layer is thicker than the inner layer. In some embodiments, the outer layer has a thickness between 50% and 80% a total thickness of the inner layer, the outer layer, and the barrier layer. In some embodiments, the outer layer has a thickness of approximately 65% a total thickness of the inner layer, the outer layer, and the barrier layer. In some embodiments, the outer layer has a thickness between 0.008 inches and 0.012 inches. In some embodiments, the outer layer has a thickness between 0.095 inches and 0.010 inches.

In some embodiments, the inner layer has a thickness between 20% and 50% a total thickness of the inner layer, the outer layer, and the barrier layer. In some embodiments, the inner layer has a thickness of approximately 30% a total thickness of the inner layer, the outer layer, and the barrier layer. In some embodiments, the inner layer has a thickness between 0.003 inches and 0.008 inches. In some embodiments, the inner layer has a thickness between 0.004 inches and 0.0045 inches.

In some embodiments, the inner layer, the barrier layer, and the outer layer form a multi-layer wall structure defining a base of the container, a side wall of the container having a lower rim coupling the side wall to a perimeter of the base, and a flange of the container coupled to an upper rim of the side wall and extending radially outward from the upper rim.

In some embodiments, the barrier layer is biased toward the inside surface of the container within a portion of the side wall proximate the base such that the outer layer is thicker than the inner layer within the portion of the side wall proximate the base and biased toward the outside surface of the container within a portion of the side wall proximate the flange such that the inner layer is thicker than the outer layer within the portion of the side wall proximate the flange.

In some embodiments, the flange includes a plurality of ribs extending radially along a lower surface of the flange. In some embodiments, the plurality of ribs include at least 32 ribs. However, it is contemplated that the flange may include any number of ribs or any other support structure (e.g., waves, etc.) depending on the geometry and size of the flange. In some embodiments, the flange includes an energy director ring protruding from an upper surface of the flange. In some embodiments, the side wall includes an energy director ring protruding from an inner surface of the side wall.

Another implementation of the present disclosure is an injection molding control system. The control system includes an injection molding apparatus, a camera, and a controller. The injection molding apparatus is configured to coinject a plurality of polymeric materials into a mold cavity to form a multi-layer container having an inner layer, an outer layer, and a barrier layer located between the inner layer and the outer layer. The camera is configured to capture images indicating a location of the barrier layer within the multi-layer container. The controller is configured to monitor the location of the barrier layer using the images captured by the camera, compare the location of the barrier layer to a threshold location, and provide a control signal to the injection molding apparatus based on the location of the barrier layer relative to the threshold location.

In some embodiments, the images are captured by the camera while the injection molding apparatus is coinjecting the plurality of polymeric materials. In some embodiments, the controller is configured to provide the control signal to the injection molding apparatus in response to a determination that the barrier layer has reached the threshold location. The control signal may cause the injection molding apparatus to stop injecting the barrier layer into the mold cavity.

In some embodiments, the images are captured by the camera after the injection molding apparatus has completed coinjecting the plurality of polymeric materials. The control signal may cause the injection molding apparatus to update a timing parameter used to inject the barrier layer into the mold cavity.

In some embodiments, the camera actively monitors the location of the barrier layer during molding and provides a feedback signal used to control the injection molding apparatus. In other embodiments, the camera inspects the location of the barrier layer after molding is complete. The controller can accept or reject each coinjection molded container based on the locations of the barrier layer. The controller can be configured to trigger an alarm if a threshold number or percentage of the containers are rejected.

In some embodiments, the multi-layer container includes a flange configured to seal with a cover for the multi-layer container. The threshold location may be within the flange of the multi-layer container.

In some embodiments, the threshold location is a location at which the barrier layer covers less than 95% of a surface area of the multi-layer container through which gas permeates into the multi-layer container.

In some embodiments, the location of the barrier layer is a location of a leading edge of the barrier layer as the barrier layer is flowing through the mold cavity. In some embodiments, the controller is configured to determine that the barrier layer has reached the threshold location in response to a determination that any part of the leading edge has reached threshold location. In some embodiments, the controller is configured to determine that the barrier layer has reached the threshold location in response to a determination that all of the leading edge has crossed the threshold location.

In some embodiments, the controller is configured to determine a location of the leading edge at a plurality of points along the leading edge, calculate an average location of the leading edge based on the location of the leading edge at each of the plurality of points along the leading edge, and determine that the barrier layer has reached the threshold location in response to a determination that the average location of the leading edge has reached the threshold location.

In some embodiments, the inner layer and the outer layer include a first polymeric material and the barrier layer includes a second polymeric material less permeable to gas than the first polymeric material. In some embodiments, the first polymeric material includes at least one of polyethylene (PE), polyethylene terephthalate (PET), polylactic acid (PLA), or polypropylene (PP). In some embodiments, the second polymeric material includes a polymer that opposes gas permeation. In some embodiments, the second polymeric material includes at least one of ethyl vinyl alcohol (EVOH), MXD6 nylon, polyglycolide (PGA), or polyphenylenebenzobisoxazole (PBOH). Although several examples of suitable materials for the second polymeric material are provided, it should be understood that the second polymeric material is not limited to these examples. The second polymeric material can be any material that prevents, reduces, or opposes the permeation of oxygen or other gasses into the container.

Another implementation of the present disclosure is a method for coinjection molding a multi-layer container. The method includes operating an injection molding apparatus to coinject a plurality of polymeric materials into a mold cavity to form a multi-layer container. In some embodiments, the polymeric materials are coinjected into multiple mold cavities to form multiple multi-layer containers. The container includes an inner layer, an outer layer, and a barrier layer located between the inner layer. The method includes using a camera to capture images indicating a location of the barrier layer within the multi-layer container, monitoring the location of the barrier layer using the images captured by the camera, comparing the location of the barrier layer to a threshold location, and providing a control signal to the injection molding apparatus based on the location of the barrier layer relative to the threshold location.

In some embodiments, the images are captured by the camera while the injection molding apparatus is coinjecting the plurality of polymeric materials. In some embodiments, the control signal is provided to the injection molding apparatus in response to a determination that the barrier layer has reached the threshold location. The control signal may cause the injection molding apparatus to stop injecting the barrier layer into the mold cavity.

In some embodiments, the images are captured by the camera after the injection molding apparatus has completed coinjecting the plurality of polymeric materials. The control signal may cause the injection molding apparatus to update a timing parameter used to inject the barrier layer into the mold cavity In some embodiments, the multi-layer container includes a flange configured to seal with a cover for the multi-layer container. The threshold location may be within the flange of the multi-layer container.

In some embodiments, the threshold location is a location at which the barrier layer covers less than 95% of a surface area of the multi-layer container through which gas permeates into the multi-layer container.

In some embodiments, the location of the barrier layer is a location of a leading edge of the barrier layer as the barrier layer is flowing through the mold cavity. In some embodiments, determining whether the barrier layer has reached the threshold location includes determining that any part of the leading edge has reached threshold location. In some embodiments, determining whether the barrier layer has reached the threshold location includes determining that all of the leading edge has crossed the threshold location.

In some embodiments, determining whether the barrier layer has reached the threshold location includes determining a location of the leading edge at a plurality of points along the leading edge, calculating an average location of the leading edge based on the location of the leading edge at each of the plurality of points along the leading edge, and determining that the barrier layer has reached the threshold location in response to a determination that the average location of the leading edge has reached the threshold location. In other embodiments, the position of the barrier layer is determined using a mask and defining varying levels of brightness.

In some embodiments, the inner layer and the outer layer include a first polymeric material and the barrier layer includes a second polymeric material less permeable to gas than the first polymeric material. In some embodiments, the first polymeric material includes at least one of polyethylene (PE), polyethylene terephthalate (PET), polylactic acid (PLA), or polypropylene (PP). In some embodiments, the second polymeric material includes a polymer that opposes gas permeation. In some embodiments, the second polymeric material includes at least one of ethyl vinyl alcohol (EVOH), MXD6 nylon, polyglycolide (PGA), or polyphenylenebenzobisoxazole (PBOH). Although several examples of suitable materials for the second polymeric material are provided, it should be understood that the second polymeric material is not limited to these examples. The second polymeric material can be any material that prevents, reduces, or opposes the permeation of oxygen or other gasses into the container Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 2:
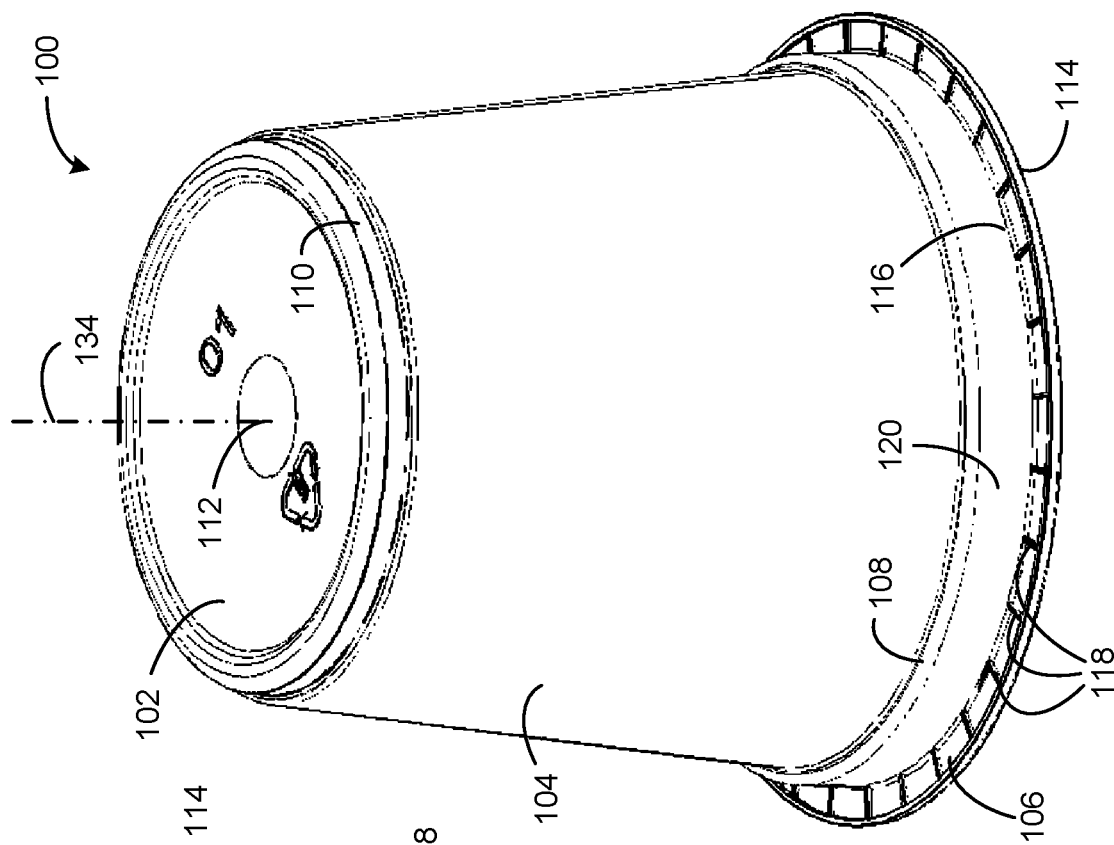
FIG. 2 is a bottom perspective view of the container of FIG. 1, according to an exemplary embodiment.

Referring generally to the FIGURES, a multi-layer injection molded container, a molding control system, and components thereof are shown according to various exemplary embodiments. The container can be formed by coinjection molding a plurality of polymeric materials into a mold cavity to form a layered wall structure. The layered wall structure of may include an inner layer, a barrier layer, and an outer layer. The inner layer and outer layer may include a first polymeric material (e.g., polyethylene (PE), polyethylene terephthalate (PET), polylactic acid (PLA), polypropylene (PP), etc.) and may form the overall shape of the multi-layer container.

The barrier layer may be located between the inner layer and outer layer and may include a second polymeric material, different from the first polymeric material. In some embodiments, the barrier layer is relatively less permeable to gas than the inner layer and outer layer. In some embodiments, the barrier layer is a passive barrier that prevents the permeation of gasses therethrough. For example, the barrier layer may be formed of ethyl vinyl alcohol (EVOH), MXD6 nylon, polyglycolide (PGA), polyphenylenebenzobisoxazole (PBOH) or other passive barrier material or desiccant material configured to prevent or greatly reduce the permeation of oxygen and/or other gasses through the container. In some embodiments, the barrier layer includes an active barrier component such as a gas-scavenging material or oxygen-scavenging material that actively eliminates oxygen or other gasses at the location of the barrier layer. Although several specific examples of barrier layer materials are provided, it should be understood that the barrier layer can include any material configured to prevent or reduce the permeation of oxygen or other gasses.

The molding control system can be configured to monitor and control the coinjection molding process by which the container is formed. In some embodiments the molding control system includes a controller, an injection molding apparatus, and a camera. The controller can provide control signals to the injection molding apparatus, which cause the injection molding apparatus to coinject the inner layer, barrier layer, and outer layer into a mold cavity. The camera can monitor the position of the barrier layer during coinjection and can provide images of the position of the barrier layer to the controller.

The controller can use the images from the camera to identify the position of the leading edge of the barrier layer and can determine when the leading edge has reached a threshold location. When the position of the leading edge reaches the threshold location, the controller can provide a control signal to the injection molding apparatus to cause the injection molding apparatus to stop injecting the barrier layer into the mold cavity. In this way, the controller can precisely control the location at which the barrier layer ends within the multi-layer wall structure that forms the container.

In some embodiments, the camera actively monitors the location of the barrier layer during molding and provides a feedback signal used to control the injection molding apparatus. In other embodiments, the camera inspects the location of the barrier layer after molding is complete. The controller can accept or reject each coinjection molded container based on the locations of the barrier layer. The controller can be configured to trigger an alarm if a threshold number or percentage of the containers are rejected. In some embodiments, the controller automatically updates a timing parameter used to control coinjection of the barrier layer to adjust the location of the barrier layer in subsequent containers.

Before discussing further details of the multi-layer injection molded container, the molding control system, and/or the components thereof, it should be noted that references to "front," "back," "rear," "upper," "lower," "inner," "outer," "right," and "left," and other directions in this description are merely used to identify the various elements as they are oriented in the FIGURES. These terms are not meant to limit the element which they describe, as the various elements may be oriented differently in various applications. Additionally, any dimensions or sizes specified for the injection molded container and/or the components thereof should be interpreted as describing an exemplary embodiment and should not be regarded as limiting. The container can have any of a variety of shapes and/or sizes in various applications.

Container Structure

Figure 1:
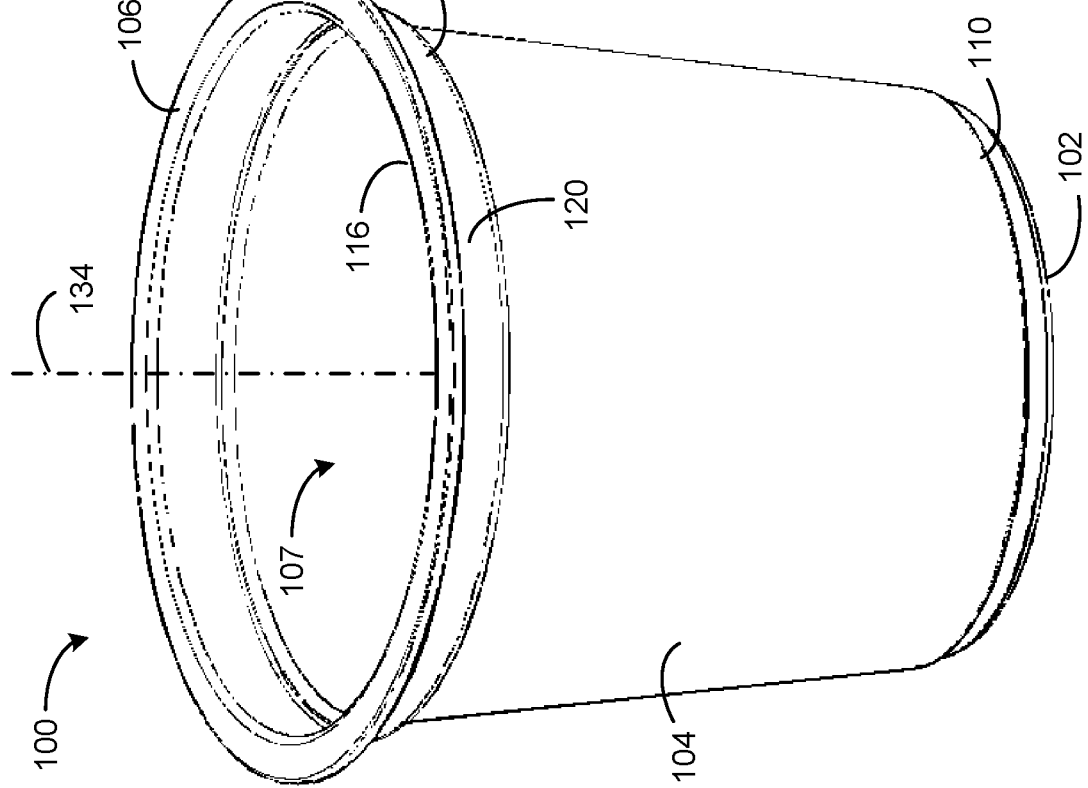
FIG. 1 is a top perspective view of a multi-layer injection molded container, according to an exemplary embodiment.
Figure 4:
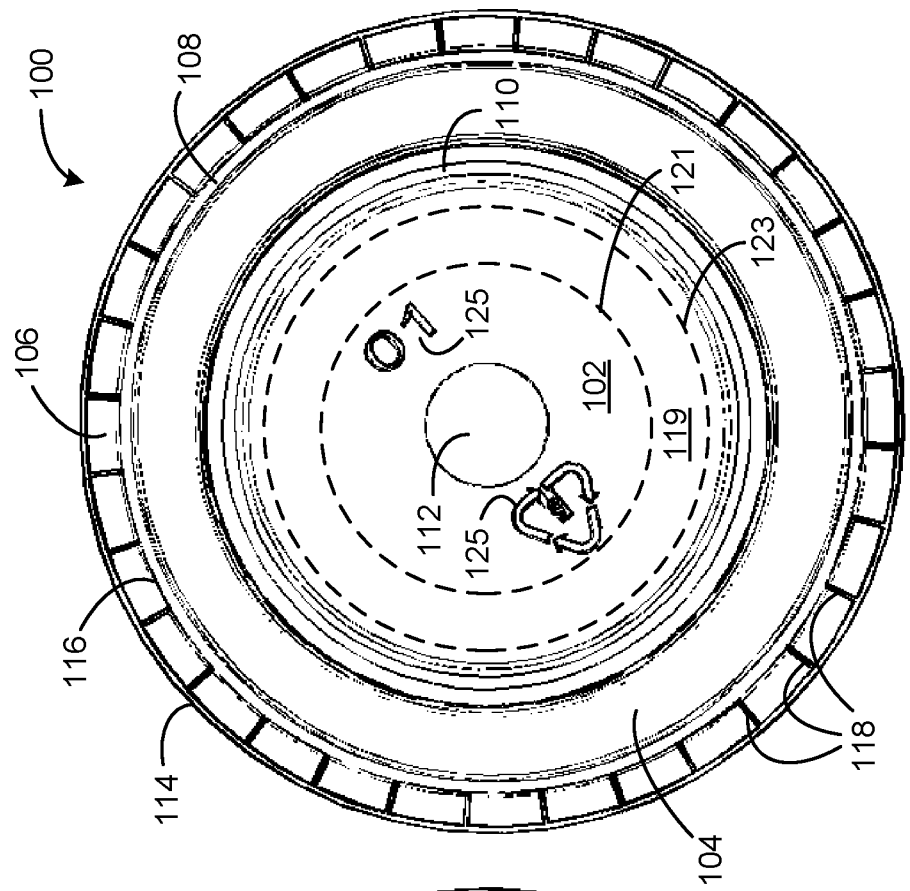
FIG. 4 is a bottom view of the container of FIG. 1, according to an exemplary embodiment.
Figure 3:
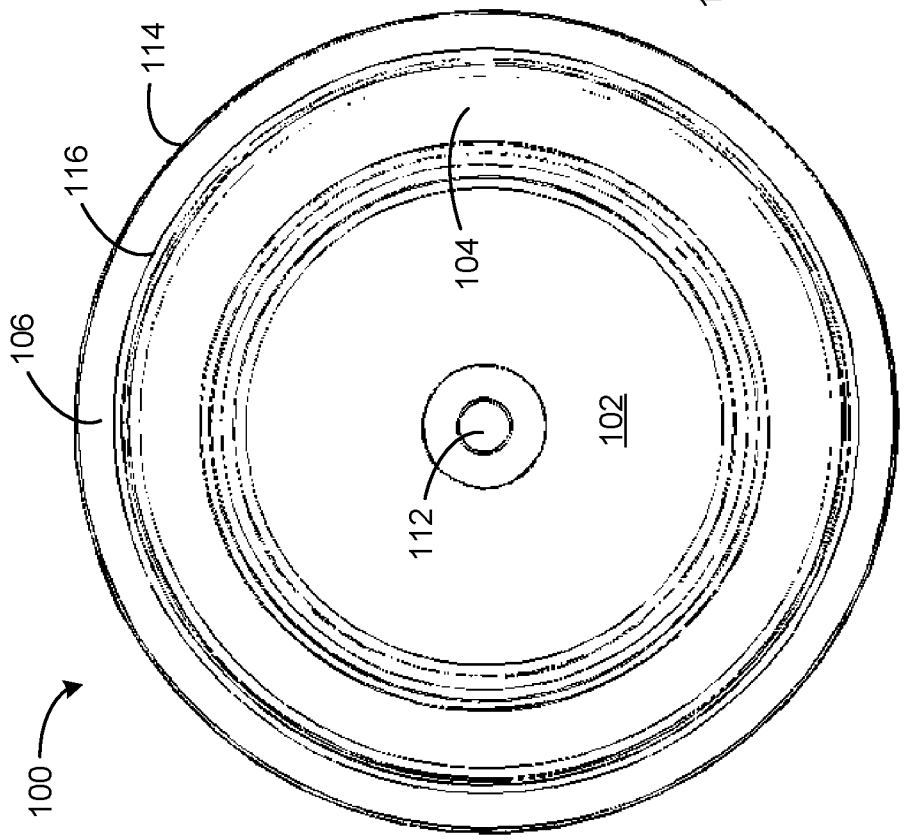
FIG. 3 is a top view of the container of FIG. 1, according to an exemplary embodiment.
Figure 6:
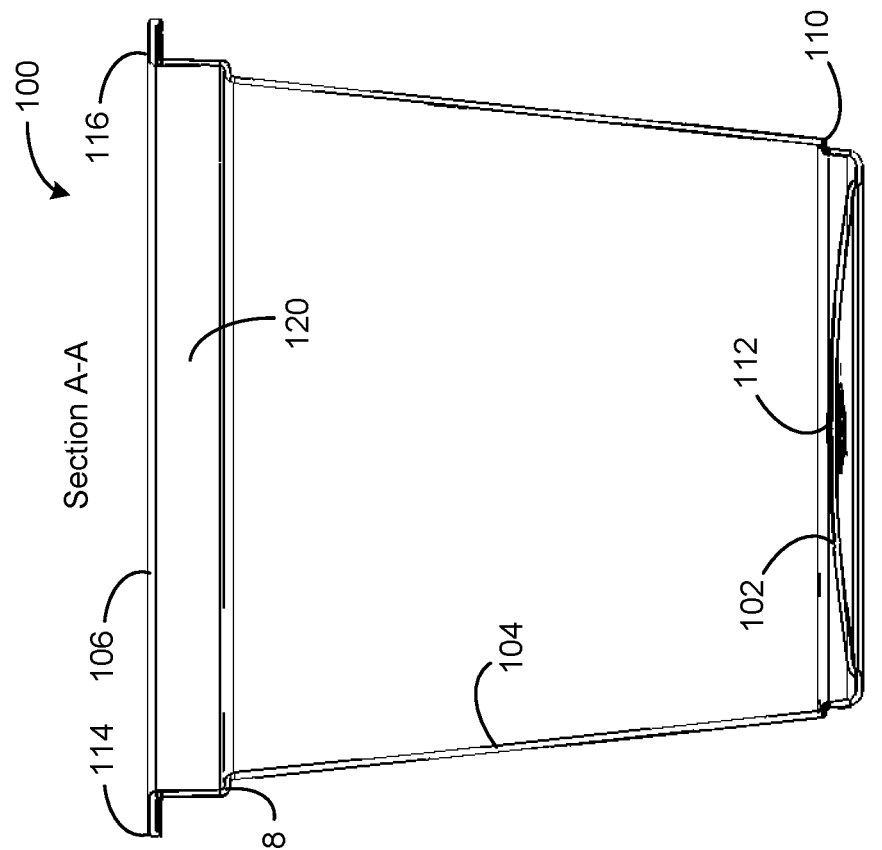
FIG. 6 is a side cross-sectional view of the container of FIG. 1 taken along the line A-A in FIG. 5, according to an exemplary embodiment.
Figure 5:
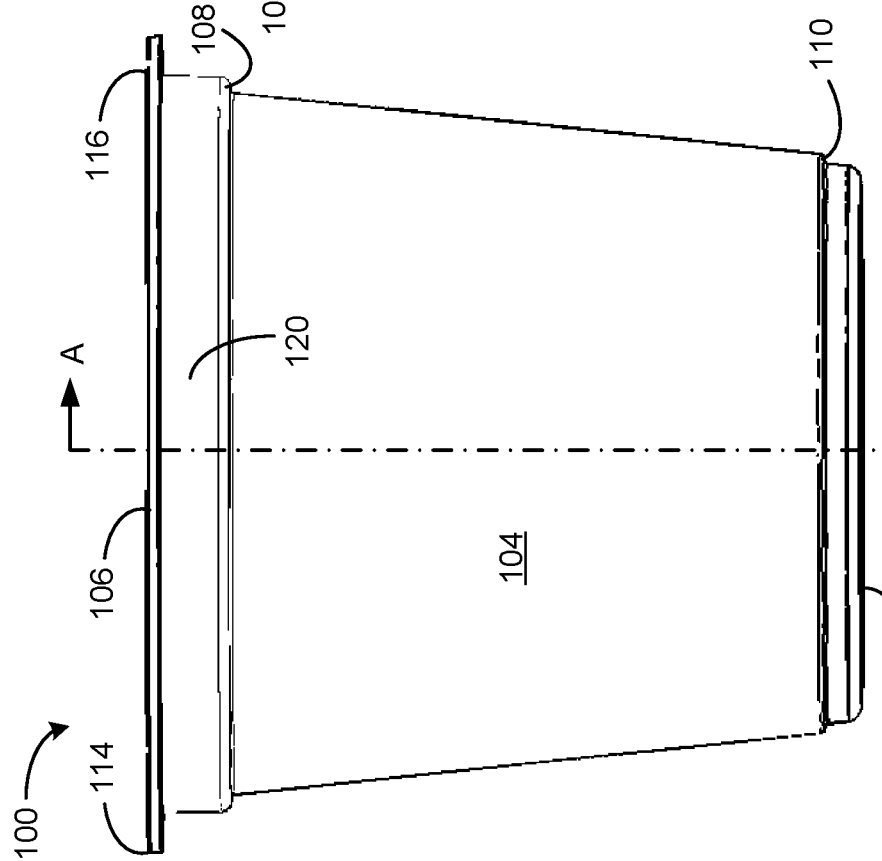
FIG. 5 is a side elevation view of the container of FIG. 1, according to an exemplary embodiment.

Referring now to FIGS. 1-6, a multi-layer injection molded container 100 is shown, according to an exemplary embodiment. In brief overview, FIG. 1 is a top perspective view of container 100; FIG. 2 is a bottom perspective view of container 100; FIG. 3 is a top view of container 100; FIG. 4 is a bottom view of container 100; FIG. 5 is a side elevation view of container 100, and FIG. 6 is a side cross-sectional view of container 100 taken along the line A-A in FIG. 5. In some embodiments, container 100 is formed by coinjection molding a plurality of polymeric materials into a mold cavity to form a layered wall structure. The coinjection molding process by which container 100 is formed is described in greater detail with reference to FIGS. 11-15.

Container 100 is shown to include a base 102, a side wall 104, a flange 106, an upper shoulder 108 located at an upper rim of side wall 104, a lower shoulder 110 located at a lower rim of side wall 104, and a neck 120 connecting upper shoulder 108 to flange 106. In some embodiments, container 100 is rotationally symmetric about a central axis 134 that passes through a center point 112 of base 102. Center point 112 may also be the location of the gate at which the polymeric materials are injected into the mold cavity. Container 100 may be generally cup-shaped or U-shaped, having an open end 107 opposite base 102 and an open internal volume bounded by at least base 102, side wall 104, and neck 120. However, it is contemplated that container 100 can have a variety of shapes (e.g., rectangular, cylindrical, frustoconical, etc.) without departing from the teachings of the present disclosure. The shape of container 100 may be defined by the shape of the mold cavity used to form container 100.

Base 102 forms the lower surface of container 100. In some embodiments, base 102 is substantially circular and extends radially outward from center point 112. Base 102 can be planar or curved in various embodiments. For example, FIGS. 2 and 6 show base 102 having a concave shape when viewed from the outside of container 100 (i.e., curving inward toward the inside of container 100). In some embodiments, base 102 includes lettering or symbols 125 (e.g., a recycling symbol) visible on the outside surface of base 102. The lettering or symbols 125 can be part of the mold cavity used to form container 100 (e.g., an embossment) or can be added to container 100 after molding (e.g., via laser etching). In some embodiments, base 102 has a diameter between 1 inch and 1.5 inches. According to an exemplary embodiment, the diameter of base 102 is approximately 1.35 inches. In some embodiments, base 102 has a thickness between 0.01 inches and 0.02 inches. According to an exemplary embodiment, the thickness of base 102 is approximately 0.015 inches. The outer perimeter of base 102 may connect to lower shoulder 110, which connects base 102 to side wall 104. Advantageously, lower shoulder 110 provides structural support for container 100 to allow force to be applied to base 102 without crushing container 100. For example, a piercing force may be applied to the outside surface of base 102 to pierce a hole through base 102 when container 100 is used. The structural support provided by lower shoulder 102 prevents container 100 from being crushed when the piercing force is applied.

Side wall 104 forms some or all of the side surface of container 100. In some embodiments, side wall 104 is substantially frustoconical, extending upward and radially outward from lower shoulder 110. In other embodiments, side wall 104 is substantially cylindrical (i.e., forming the circumferential surface of a cylinder). Side wall 104 may be angled relative to central axis 134 by an angle ranging from 0° to 10°. In some embodiments, side wall 104 is angled relative to central axis 134 by approximately 6°. The lower rim of side wall 104 may connect to lower shoulder 110, which connects side wall to base 102. The upper rim of side wall 104 may connect to upper shoulder 108, which connects side wall 104 to neck 120.

In some embodiments, side wall 104 has a thickness between 0.01 inches and 0.02 inches. According to an exemplary embodiment, the thickness of side wall 104 is approximately 0.015 inches. In some embodiments, the lower diameter of side wall 104 (i.e., the diameter at lower shoulder 110) is between 1 inch and 1.5 inches. According to an exemplary embodiment, the lower diameter of side wall 104 is approximately 1.35 inches. In some embodiments, the upper diameter of side wall 104 (i.e., the diameter at upper shoulder 108 may be between 1.5 inches and 2.0 inches. According to an exemplary embodiment, the upper diameter of side wall 104 is approximately 1.7 inches. In some embodiments, the height of side wall 104 may be between 1.5 inches and 2.0 inches. According to an exemplary embodiment, the height of side wall 104 is approximately 1.74 inches.

Neck 120 may form a portion of the side surface of container 100. In some embodiments, neck 120 is substantially cylindrical, extending upward from upper shoulder 108. In some embodiments, the diameter of neck 120 is between 1.5 inches and 2.0 inches. According to an exemplary embodiment, the diameter of neck 120 is approximately 1.8 inches. In some embodiments, neck 120 has a thickness between 0.01 inches and 0.02 inches. According to an exemplary embodiment, the thickness of neck 120 is approximately 0.015 inches. In some embodiments, the height of neck 120 is between 0.1 inches and 0.3 inches. According to an exemplary embodiment, the height of neck 120 is approximately 0.2 inches. Neck may connect upper shoulder 108 to the inner rim 116 of flange 106.

Flange 106 may form the upper surface of container 100. In some embodiments, flange 106 is substantially annular (i.e., ring-shaped) extending radially outward from inner rim 116 to outer rim 114. A cover, lid, or other closure can be sealed to container 100 along flange 106 to cover open end 107 of container 100. In some embodiments, the diameter of inner rim 116 is between 1.5 inches and 2.0 inches. According to an exemplary embodiment, the diameter of inner rim 116 is approximately 1.8 inches. In some embodiments, diameter of outer rim 114 is between 1.75 inches and 2.25 inches. According to an exemplary embodiment, the diameter of outer rim 114 is approximately 2.0 inches. As such, the distance between inner rim 116 and outer rim 114 (i.e., the radial distance of flange 106) may be approximately 0.20 inches.

In some embodiments, container 100 includes a plurality of reinforcing ribs 118 on the lower surface of flange 106. Ribs 118 may extend radially outward from inner rim 116 to outer rim 114. In some embodiments, ribs 118 include between 10 and 50 radial ribs spaced equally or non-equally along the lower surface of flange 106. In some embodiments, ribs 118 include approximately 32 radial ribs. However, it is contemplated that flange 106 may include any number of ribs 118 or any other support structure (e.g., waves, etc.) depending on the geometry and size of flange 106. In some embodiments, flange 106 does not include any ribs 118 or other support structure. In other words, ribs 118 may be omitted from flange 106 entirely.

The height of ribs 118 is the distance ribs 118 extend downward from the lower surface of flange 106. In some embodiments, ribs 118 have a height between 0.005 inches and 0.015 inches. According to an exemplary embodiment, ribs 118 have a height of approximately 0.01 inches. The thickness of ribs 118 is the circumferential distance between opposing sides of each rib 118. In some embodiments, ribs 118 have a thickness between 0.005 inches and 0.015 inches. According to an exemplary embodiment, ribs 118 have a thickness of approximately 0.01 inches.

Referring particularly to FIG. 4, container 100 is shown to include a puncture zone 119. Puncture zone 119 may be a portion of base 102 (e.g., an annular zone or ring) located between an inner boundary 121 and an outer boundary 123. In some embodiments, inner boundary 121 is a first circular boundary having a first radius, whereas outer boundary 123 is a second circular boundary having a second radius larger than the first radius. The portion of base 102 within puncture zone 119 is configured to be punctured when container 100 is used to allow access to the contents within container 100. For example, if container 100 is used to store coffee grounds, puncture zone 119 can be punctured to allow for hot water to flow into container 100 to percolate the coffee. Puncture zone 119 is provided as a ring that extends around base 102 to allow container 100 to be inserted into the coffee machine in any orientation.

In some embodiments, the lettering or symbols 125 in base 102 are located in a portion of base 102 outside puncture zone 119. For example, lettering or symbols 125 may be located in a portion of base 102 inside inner boundary 121 (as shown in FIG. 4) or outside outer boundary 123 such that lettering or symbols 125 are not located between inner boundary 121 and outer boundary 123. This ensures that base 102 will be punctured at a point that does not overlap with letting or symbols 125, regardless of the orientation in which container 100 is inserted into a machine that punctures base 102, thereby improving the reliability and consistency of the puncturing operation.

The height of lettering or symbols 125 is the amount that lettering or symbols 125 extend from the surface of base 102. For embodiments in which lettering or symbols 125 are formed as part of the injection molding process, lettering or symbols 125 may have a height sufficient for lettering or symbols 125 to be visible without causing distortions to the flow of the materials used to form container 100 during injection molding. For example, lettering or symbols 125 may have a height of approximately 0.002 inches. In some embodiments, lettering or symbols 125 have a height of 10% or less of the nominal thickness of base 102, or 20% or less of the nominal thickness of base 102. In some embodiments, lettering or symbols 125 have a height between approximately 10% of the nominal thickness of base 102 and 20% of the nominal thickness of base 102.

Multi-Layer Wall Structure

Figure 7:
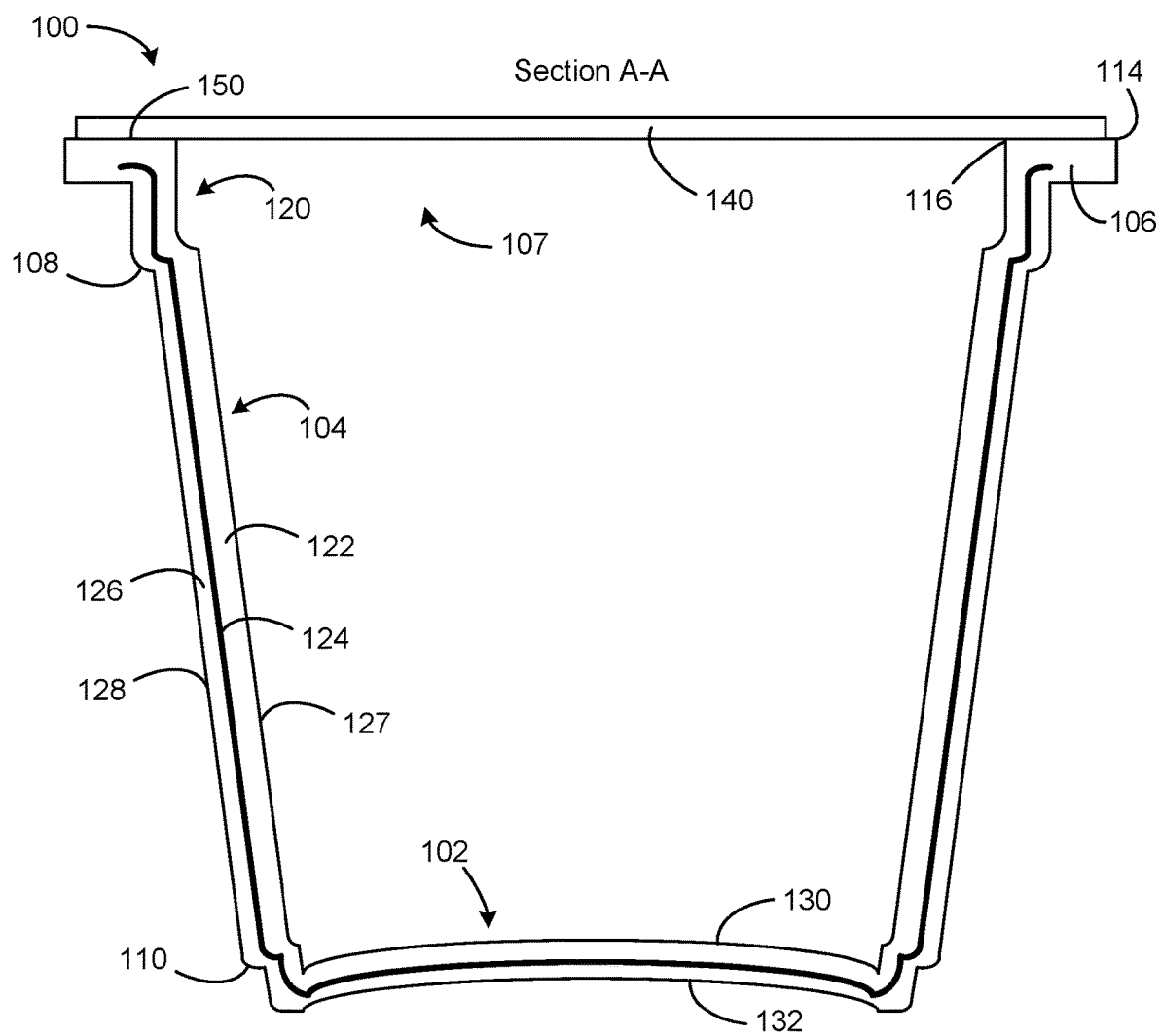
FIG. 7 is a side cross-sectional view of the container of FIG. 1 showing an internal barrier layer biased toward an outside surface of the container, according to an exemplary embodiment.
Figure 8:
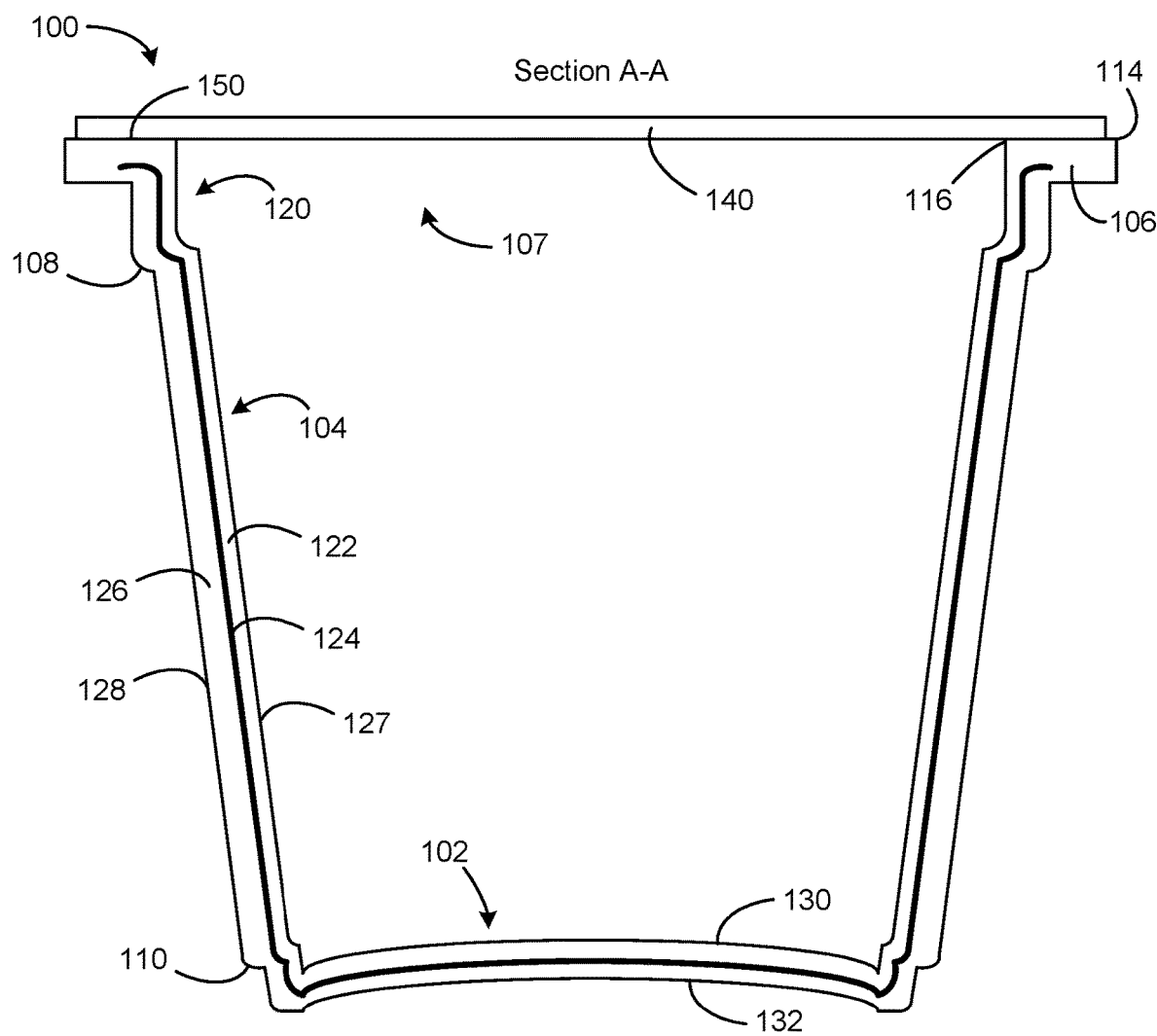
FIG. 8 is a side cross-sectional view of the container of FIG. 1 showing the internal barrier layer biased toward an inside surface of the container, according to an exemplary embodiment.
Figure 9:
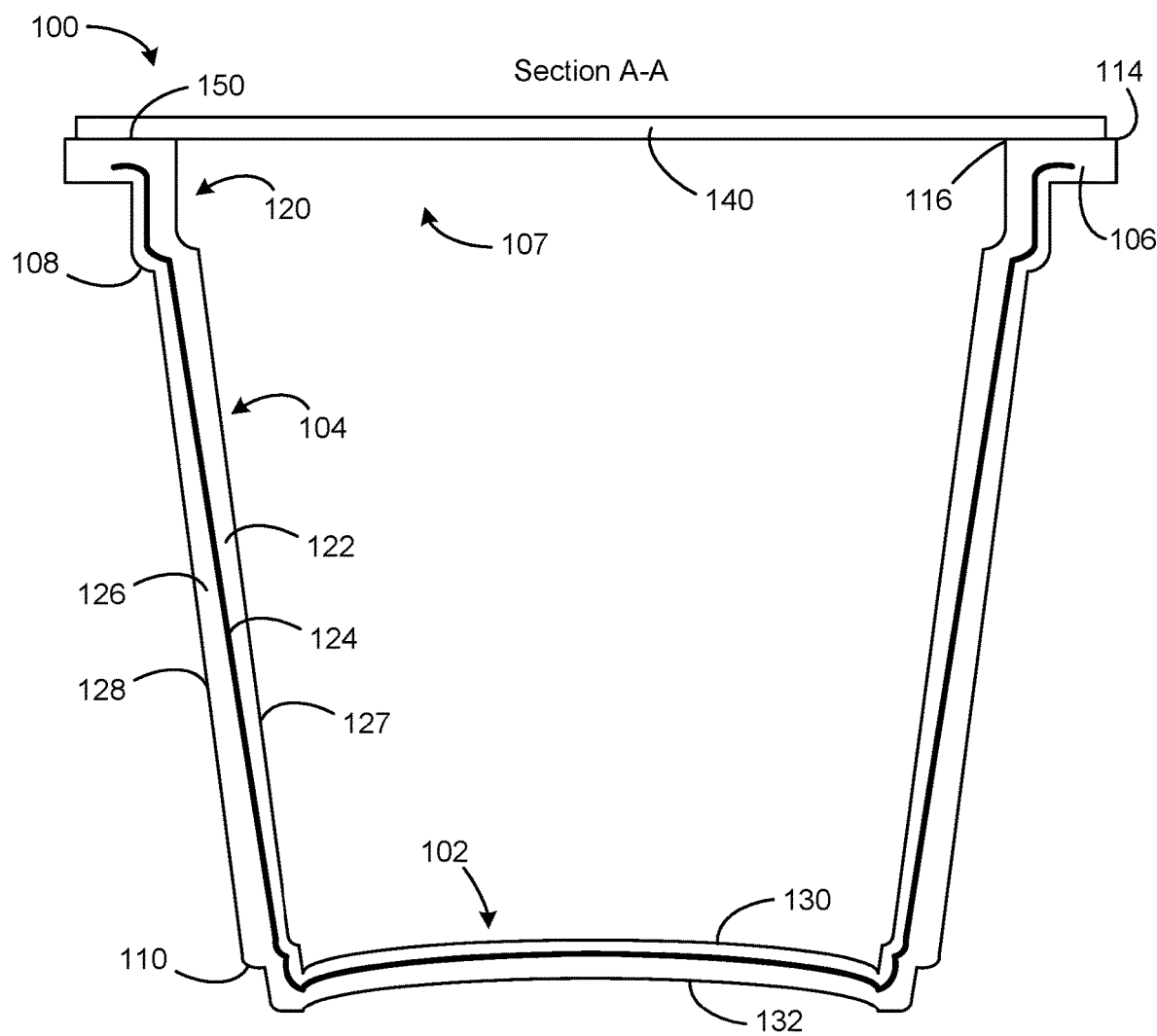
FIG. 9 is a side cross-sectional view of the container of FIG. 1 showing the internal barrier layer biased toward the outside surface of the container proximate an open end of the container and biased toward the inside surface of the container proximate a base of the container, according to an exemplary embodiment.

Referring now to FIGS. 7-9, a multi-layer wall structure of container 100 is shown, according to several exemplary embodiments. As discussed above, container 100 can be formed by coinjection molding a plurality of polymeric material into a mold cavity to form a layered wall structure. The layered wall structure may extend through base 102, lower shoulder 110, side wall 104, upper shoulder 108, neck 120, and at least partially into flange 106. The layered wall structure of container 100 is shown to include an inner layer 122, a barrier layer 124, and an outer layer 126. It should be noted that the thicknesses of layers 122-126 are greatly exaggerated in FIGS. 7-9 for purposes of illustration. Layers 122-126 can be coinjection molded via an injection molding apparatus (described in greater detail with reference to FIGS. 11-15) and may combine to form the structure of multi-layer container 100.

Advantageously, the layered wall structure of container 100 may have a substantially uniform nominal thickness. For example, the nominal thickness of base 102, lower shoulder 110, side wall 104, upper shoulder 108, neck 120, and/or flange 106 may be the same or approximately the same. The substantially uniform nominal thickness is a result of the coinjection molding process used to form container 100. This provides a distinct advantage over prior art containers formed using other techniques (e.g., thermoforming) that cannot achieve a substantially uniform nominal thickness. For example, thermoformed containers are typically stretched during the forming process such that some portions of thermoformed containers are thicker than others. However, the coinjection molding process used to form container 100 ensures that the nominal thickness of container 100 is substantially uniform throughout container 100.

The substantially uniform nominal thickness of container 100 also allows container 100 to be pierced more easily than prior art containers. For example, thermoformed containers may have a base that is significantly thicker than the side walls due to the stretching of the side walls during the thermoforming process. This results in a container in which the base can be difficult to puncture due to the increased thickness of the base. However, the coinjection molding process used to form container 100 ensures that the nominal thickness of base 102 is the same as the nominal thickness of side wall 104 to allow base 102 to be punctured more easily.

Inner layer 122 and outer layer 126 may include or consist of a first polymeric material (e.g., polyethylene (PE), polyethylene terephthalate (PET), polylactic acid (PLA), polypropylene (PP), etc.) and may form the overall shape of container 100. Barrier layer 124 may be located between inner layer 122 and outer layer 126 and may include or consist of a second polymeric material, different from the first polymeric material. Barrier layer 124 may be substantially fully surrounded by inner layer 122 and outer layer 126 such that none of barrier layer 124 is exposed to the outside or inside of container 100. In some embodiments, barrier layer 124 is relatively less permeable to gas than inner layer 122 and outer layer 126. For example, barrier layer 124 may be formed of a passive barrier material (e.g., ethyl vinyl alcohol (EVOH), MXD6 nylon, polyglycolide (PGA), polyphenylenebenzobisoxazole (PBOH) etc.) or other barrier material or desiccant material configured to prevent or greatly reduce the permeation of oxygen and/or other gasses through barrier layer 124. In some embodiments, barrier layer 124 includes an active barrier component such as a gas-scavenging material or oxygen-scavenging material that actively eliminates oxygen or other gasses at the location of barrier layer 124. Although several examples of suitable materials for barrier layer 124 are provided, it should be understood that barrier layer 124 is not limited to these examples. Barrier layer 124 can include or consist of any material that prevents, reduces, or opposes the permeation of oxygen or other gasses into container 100.

In some embodiments, one or more of layers 122-126 is made of a recyclable material and/or a compostable material. A compostable material can be defined as a plastic or other material designed to be composted under aerobic conditions in municipal and/or industrial aerobic composting facilities, where thermophilic conditions are achieved. For example, one or more of layers 122-126 may be made of a compostable material that satisfies the ASTM D6400 standard specification for compostable materials. In some embodiments, one or more of layers 122-126 are made of a biodegradable material. Some materials may be both compostable and biodegradable.

In some embodiments, barrier layer 124 covers less than 95% of the total surface area of container 100 through which oxygen or other gasses can permeate through the layered wall structure. For example, barrier layer 124 may extend through all of base 102, all of lower shoulder 110, some or all of side wall 104, and optionally through some or all of upper shoulder 108, neck 120, and/or flange 106. In some embodiments, barrier layer 124 ends at or near the intersection of flange 106 and neck 120 (e.g., near inner rim 116). For example, barrier layer 124 may extend through neck 120 and end shortly after barrier layer 124 enters flange 106. The end point of barrier layer 124 within flange 106 can be controlled during injection molding using a feedback control technique, described in greater detail with reference to FIGS. 11-15.

As shown in FIGS. 7-9, container 100 can be closed by sealing a cover 140 (e.g., a lid, closure, etc.) to the upper surface 150 of flange 106. Surface 150 extends circumferentially around open end 107 along flange 106. Cover 140 can be sealed to flange 106 along surface 150 by any of a variety of sealing methods (e.g., heat-sealing, crimping, threading, ultrasonic welding or other types of welding, etc.).

Referring particularly to FIG. 7, a cross-section of container 100 is shown, according to a first exemplary embodiment. In the embodiment of FIG. 7, barrier layer 124 is biased toward the outer surface 128 of side wall 104. For example, the distance between barrier layer 124 and outer surface 128 of side wall 104 may be less than the distance between barrier layer 124 and inner surface 127 of side wall 104. Similarly, barrier layer 124 can be biased toward the lower surface 132 of base 102. For example, the distance between barrier layer 124 and lower surface 132 of base 102 may be less than the distance between barrier layer 124 and upper surface 130 of base 102.

When barrier layer 124 is biased toward outer surface 128 and/or lower surface 132, inner layer 122 may be thicker than outer layer 126. The relatively greater thickness of inner layer 122 allows for a filter or other layer to be welded onto inner surface 127 and/or upper surface 130 without penetrating into or through barrier layer 124. Advantageously, this ensures that barrier layer 124 remains intact, which helps prevent the permeation of oxygen or other gasses into container 100 through barrier layer 124.

In the embodiment shown in FIG. 7, the thickness of barrier layer 124 is approximately 5% of the overall thickness of the layered wall structure (i.e., 5% of the total thickness of inner layer 122, barrier layer 124, and outer layer 126). In some embodiments, barrier layer 124 has a thickness of approximately 0.00075 inches, which is approximately 5% of the total thickness of inner layer 122, barrier layer 124, and outer layer 126 (e.g., 0.015 inches). In some embodiments, the thickness of barrier layer 124 is between approximately 3% and approximately 10% of a total thickness of inner layer 122, barrier layer 124, and outer layer 126.

In some embodiments, the thickness of inner layer 122 between 50% and 80% of the overall thickness of the layered wall structure. According to an exemplary embodiment, the thickness of inner layer 122 is approximately 65% of the overall thickness of the layered wall structure. In some embodiments, inner layer 122 has a thickness between 0.008 inches and 0.012 inches. According to an exemplary embodiment, inner layer 122 has a thickness between 0.095 inches and 0.010 inches.

In some embodiments, the thickness of outer layer 126 between 20% and 50% of the overall thickness of the layered wall structure. According to an exemplary embodiment, the thickness of outer layer 126 is approximately 30% of the overall thickness of the layered wall structure. In some embodiments, outer layer 126 has a thickness between 0.003 inches and 0.008 inches. According to an exemplary embodiment, outer layer 126 has a thickness between 0.004 inches and 0.0045 inches.

Referring particularly to FIG. 8, a cross-section of container 100 is shown, according to a second exemplary embodiment. In the embodiment of FIG. 8, barrier layer 124 is biased toward inner surface 127 of side wall 104. For example, the distance between barrier layer 124 and inner surface 127 of side wall 104 may be less than the distance between barrier layer 124 and outer surface 128 of side wall 104. Similarly, barrier layer 124 can be biased toward the upper surface 130 of base 102. For example, the distance between barrier layer 124 and upper surface 130 of base 102 may be less than the distance between barrier layer 124 and lower surface 132 of base 102.

When barrier layer 124 is biased toward inner surface 127 and/or upper surface 130, outer layer 126 may be thicker than inner layer 122. The relatively greater thickness of outer layer 126 allows for lettering or other symbols to be etched onto outer surface 128 and/or lower surface 132 without penetrating into or through barrier layer 124. Advantageously, this ensures that barrier layer 124 remains intact, which helps prevent the permeation of oxygen or other gasses into container 100 through barrier layer 124.

In the embodiment shown in FIG. 8, the thickness of barrier layer 124 is approximately 5% of the overall thickness of the layered wall structure (i.e., 5% of the total thickness of inner layer 122, barrier layer 124, and outer layer 126). In some embodiments, barrier layer 124 has a thickness of approximately 0.00075 inches, which is approximately 5% of the total thickness of inner layer 122, barrier layer 124, and outer layer 126 (e.g., 0.015 inches). In some embodiments, the thickness of barrier layer 124 is between approximately 3% and approximately 10% of a total thickness of inner layer 122, barrier layer 124, and outer layer 126.

In some embodiments, the thickness of outer layer 126 between 50% and 80% of the overall thickness of the layered wall structure. According to an exemplary embodiment, the thickness of outer layer 126 is approximately 65% of the overall thickness of the layered wall structure. In some embodiments, outer layer 126 has a thickness between 0.008 inches and 0.012 inches. According to an exemplary embodiment, outer layer 126 has a thickness between 0.095 inches and 0.010 inches.

In some embodiments, the thickness of inner layer 122 between 20% and 50% of the overall thickness of the layered wall structure. According to an exemplary embodiment, the thickness of inner layer 122 is approximately 30% of the overall thickness of the layered wall structure. In some embodiments, inner layer 122 has a thickness between 0.003 inches and 0.008 inches. According to an exemplary embodiment, inner layer 122 has a thickness between 0.004 inches and 0.0045 inches.

Referring particularly to FIG. 9, a cross-section of container 100 is shown, according to a third exemplary embodiment. In the embodiment of FIG. 8, barrier layer 124 is biased toward inner surface 127 at some parts of side wall 104, and biased toward outer surface 128 at other parts of side wall 104. For example, barrier layer 124 can be biased toward inner surface 127 near lower shoulder 110 and biased toward outer surface 128 near upper shoulder 108. Barrier layer 124 may gradually move closer to outer surface 128 as barrier layer 124 extends upward within side wall 104. Accordingly, the distance between barrier layer 124 and surfaces 127-128 may vary at different locations along side wall 104. In some parts of side wall 104, the distance between barrier layer 124 and inner surface 127 may be less than the distance between barrier layer 124 and outer surface 128. In other parts of side wall 104, the distance between barrier layer 124 and outer surface 128 may be less than the distance between barrier layer 124 and inner surface 127.

When barrier layer 124 is biased toward inner surface 127 and/or upper surface 130, outer layer 126 may be thicker than inner layer 122. The relatively greater thickness of outer layer 126 allows for lettering or other symbols to be etched onto outer surface 128 and/or lower surface 132 without penetrating into or through barrier layer 124. Conversely, when barrier layer 124 is biased toward outer surface 128 and/or lower surface 132, inner layer 122 may be thicker than outer layer 126. The relatively greater thickness of inner layer 122 allows for a filter or other layer to be welded onto inner surface 127 and/or upper surface 130 without penetrating into or through barrier layer 124. Advantageously, this ensures that barrier layer 124 remains intact, which helps prevent the permeation of oxygen or other gasses into container 100 through barrier layer 124.

In the embodiment shown in FIG. 9, the thickness of barrier layer 124 is approximately 5% of the overall thickness of the layered wall structure (i.e., 5% of the total thickness of inner layer 122, barrier layer 124, and outer layer 126). In some embodiments, barrier layer 124 has a thickness of approximately 0.00075 inches, which is approximately 5% of the total thickness of inner layer 122, barrier layer 124, and outer layer 126 (e.g., 0.015 inches). In some embodiments, the thickness of barrier layer 124 is between approximately 3% and approximately 10% of a total thickness of inner layer 122, barrier layer 124, and outer layer 126.

In some embodiments, the thickness of outer layer 126 between 50% and 80% of the overall thickness of the layered wall structure near lower shoulder 110 and between 20% and 50% of the overall thickness of the layered wall structure near upper shoulder 108. According to an exemplary embodiment, the thickness of outer layer 126 is approximately 65% of the overall thickness of the layered wall structure near lower shoulder 110 and approximately 30% of the overall thickness of the layered wall structure near upper shoulder 108. In some embodiments, outer layer 126 has a thickness between 0.008 inches and 0.012 inches near lower shoulder 110 and a thickness between 0.003 inches and 0.008 inches near upper shoulder 108. According to an exemplary embodiment, outer layer 126 has a thickness between 0.095 inches and 0.010 inches near lower shoulder 110 and a thickness between 0.004 inches and 0.0045 inches near upper shoulder 108.

In some embodiments, the thickness of inner layer 122 between 20% and 50% of the overall thickness of the layered wall structure near lower shoulder 110 and between 50% and 80% of the overall thickness of the layered wall structure near upper shoulder 108. According to an exemplary embodiment, the thickness of inner layer 122 is approximately 30% of the overall thickness of the layered wall structure near lower shoulder 110 and approximately 65% of the overall thickness of the layered wall structure near upper shoulder 108. In some embodiments, inner layer 122 has a thickness between 0.003 inches and 0.008 inches near lower shoulder 110 and between 0.008 inches and 0.012 inches near upper shoulder 108. According to an exemplary embodiment, inner layer 122 has a thickness between 0.004 inches and 0.0045 inches near lower shoulder 110 and a thickness between 0.095 inches and 0.010 inches near upper shoulder 108.

In any of the embodiments shown in FIGS. 7-9, the overall thickness of side wall 104 (i.e., the total thickness of inner layer 122, barrier layer 124, and outer layer 126) can be substantially uniform or can vary at different locations along side wall 104. For example, a portion of side wall 104 can be relatively thicker than other portions of side wall 104. In some embodiments, the increased thickness of side wall 104 is added to inner layer 122. Accordingly, the thickness of outer layer 126 may be substantially uniform, whereas inner layer 122 may have both a relatively thicker portion and a relatively thinner portion. The relatively thicker portion of inner layer 122 can be used to weld a filter or other layer onto inner surface 127 of side wall 104 without penetrating into barrier layer 124. In other embodiments, the increased thickness of side wall 104 is added to outer layer 126. Accordingly, the thickness of inner layer 122 may be substantially uniform, whereas outer layer 126 may have both a relatively thicker portion and a relatively thinner portion. The relatively thicker portion of outer layer 126 can be used to add lettering, etching, engraving, indented stamping, or other modifications to outer surface 128 of side wall 104 without penetrating into barrier layer 124.

In some embodiments, the thicker portion of side wall 104 is an annular ring or band that extends circumferentially around side wall 104 and forms a closed loop. The thicker ring or band can have a height less than the total height of side wall 104 such that side wall 104 includes both a relatively thicker ring or band and one or more relatively thinner rings or bands that stack to form side wall 104. In some embodiments, the top edge of the thicker ring or band is aligned with the top edge of side wall 104 (i.e., the intersection of side wall 104 and upper shoulder 108). In other embodiments, the bottom edge of the thicker ring or band is aligned with the bottom edge of side wall 104 (i.e., the intersection of side wall 104 and lower shoulder 110). In yet other embodiments, the thicker ring or band can be positioned vertically within side wall 104 between two relatively thinner rings or bands of side wall 104 such that the thicker ring or band is not aligned with either the top edge of side wall 104 or the bottom edge of side wall 104.

Figure 10:
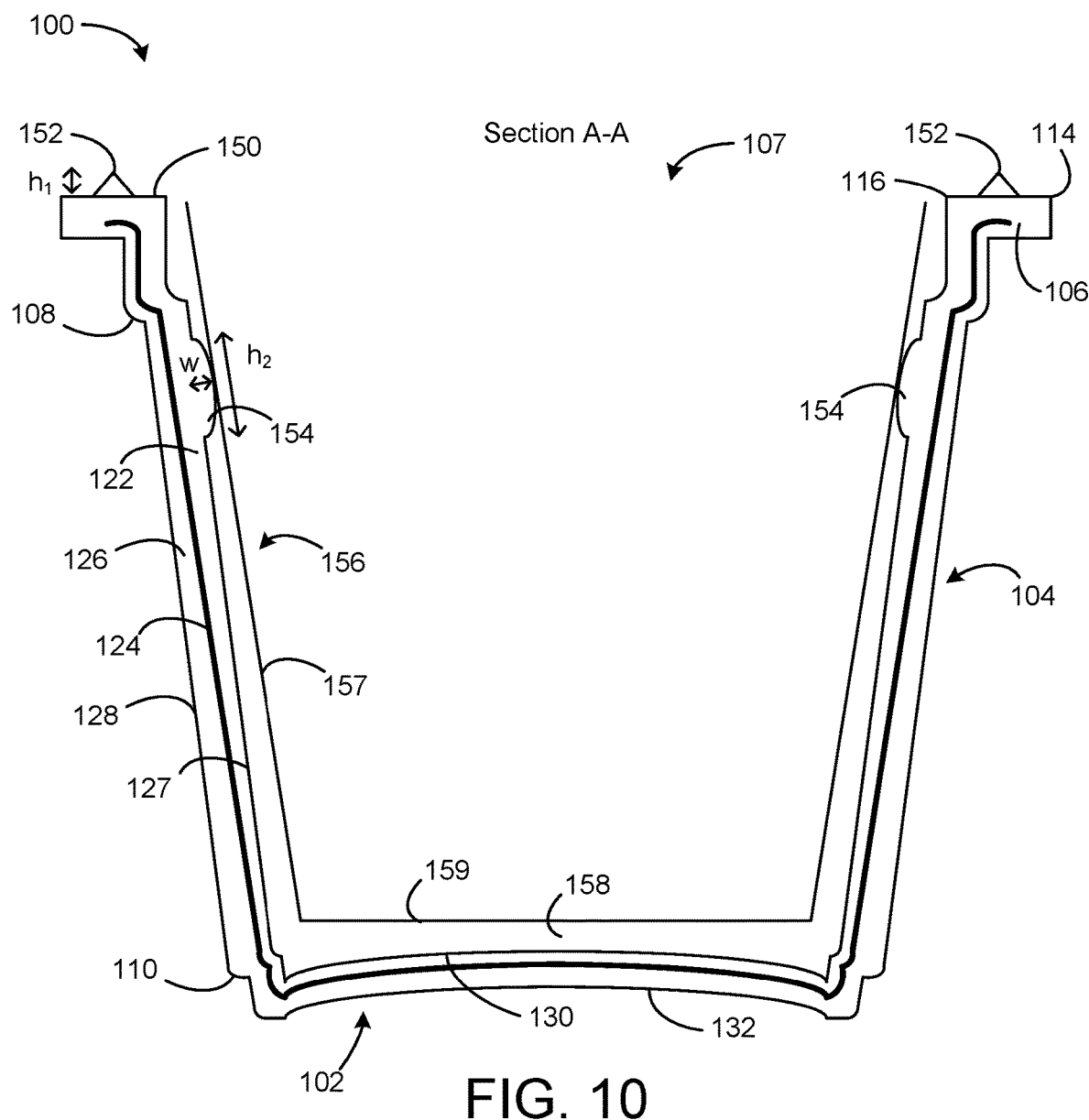
FIG. 10 is a side cross-sectional view of the container of FIG. 1 showing a first energy director ring located along a flange of the container and a second energy director ring located along a side wall of the container, according to an exemplary embodiment.

Referring particularly to FIG. 10, in some embodiments, surface 150 includes an energy director ring 152 that extends circumferentially around open end 107 along flange 106. Energy director ring 152 may extend upward from surface 150 to define the uppermost portion of container 100. When cover 140 is sealed onto flange 106, energy director ring 152 may concentrate the sealing force to ensure that the seal occurs at the location of energy director ring 152. The location of energy director ring 152 can vary along surface 150 to cause the seal to occur closer to inner rim 116 or outer rim 114, as desired.

In some embodiments, energy director ring 152 has a substantially triangular cross-section (as shown in FIG. 10). However, it is contemplated that energy director ring 152 may have any of a variety of cross-sectional shapes in various other embodiments (e.g., arcuate, rectangular, circular, etc.). In some embodiments, energy director ring 152 has a height ($h_1$) between approximately 0.005 inches and 0.010 inches. In some embodiments, the height ($h_1$) of energy director ring 152 is at least half the nominal thickness of side wall 104 and/or base 102 (e.g., at least 0.0075 inches). In some embodiments, the height ($h_1$) of energy director ring 152 is between half the nominal thickness of side wall 104 and/or base 102 and the full nominal wall thickness of side wall 104 and/or base 102.

In some embodiments, side wall 104 includes an energy director ring 154 that extends circumferentially around side wall 104. Energy director ring 154 may extend inward (i.e., toward the center of container 100) from inner surface 127 to form a portion of side wall 104 that is relatively thicker than the rest of side wall 104. When a filter 156 is welded onto side wall 104 (e.g., using ultrasonic welding or another welding technique), energy director ring 154 may concentrate the welding force to ensure that the weld occurs at the location of energy director ring 154. The location of energy director ring 154 can vary along side wall 104 to cause the weld to occur closer to flange 106 or base 102, as desired.

In some embodiments, energy director ring 154 has an arcuate cross-section (as shown in FIG. 10). However, it is contemplated that energy director ring 154 can have any of a variety of cross-sectional shapes in various other embodiments (e.g., triangular, rectangular, circular, etc.). In some embodiments, energy director ring 154 has a height ($h_2$) sufficient to securely weld filter 156 onto side wall 104. For example, the height ($h_2$) of energy director ring 154 may be between 0.050 inches and 0.100 inches in some embodiments, or between 5 mm and 10 mm in other embodiments. In some embodiments, energy director ring 154 has a width (w) (i.e., the amount by which energy director ring 154 extends from inner surface 127) between approximately 25% of the nominal thickness of side wall 104 and approximately 100% of the nominal thickness of side wall 104. For example, if the total thickness of side wall 104 is approximately 0.015 inches, the width (w) of energy director ring 154 may be between approximately 0.00375 inches (i.e., 25% of 0.015 inches) and approximately 0.015 inches (i.e., 100% of 0.015 inches). However, it is contemplated that energy director ring 154 can have any of a variety of other heights and widths in other embodiments.

As discussed above, filter 156 can be welded onto inner surface 127 of side wall 104, inside container 100. For example, filter 156 can be placed into container 100 after container 100 has been injection molded. A welding tool (e.g., a sonotrode, a heat welding device, etc.) can enter open end 107 of container 100 and press filter 156 against side wall 104. In some embodiments, the force applied by the welding tool is concentrated at the location of energy director ring 154 to cause the weld to occur at the location of energy director ring 154. Accordingly, the weld between filter 156 and side wall 104 may be a circumferential weld that extends around the circumference of side wall 104 at the location of energy director ring 154.

In some embodiments, filter 156 has a frustoconical shape that matches the shape of container 100. For example, filter 156 may have a side wall 157 that aligns with side wall 104 of container 100 and a base 159 that aligns with base 102 of container 100. In some embodiments, side wall 157 of filter 156 is relatively shorter than side wall 104 of container 100 such that base 159 of filter 156 is offset from base 102 of container 100. In other words, a gap 158 may exist between base 102 and base 159. Gap 158 may allow for base 102 of container 100 to be punctured when container 100 is used without puncturing through filter 156. For example, container 100 can be used hold coffee grounds or other food products. Base 102 can be punctured by a coffee machine to allow fluid flow into container 100 to percolate coffee grounds within container 100 without puncturing through filter 156.

Molding Control System

Figure 11:
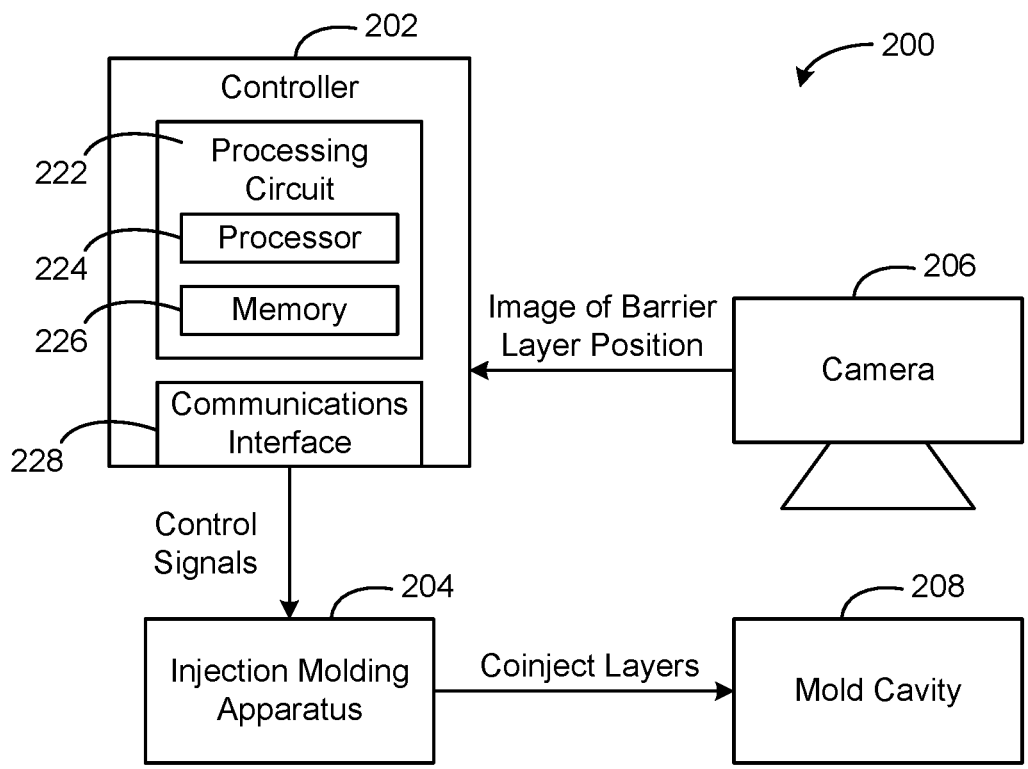
FIG. 11 is a block diagram of a molding control system which can be used to monitor and control the coinjection molding of the container of FIG. 1, according to an exemplary embodiment.

Referring now to FIG. 11, a block diagram of a molding control system 200 is shown, according to an exemplary embodiment. Control system 200 can be configured to monitor and control the coinjection molding process by which container 100 is formed. Control system 200 is shown to include a controller 202, an injection molding apparatus 204, a camera 206, and a mold cavity 208. Controller 202 can provide control signals to injection molding apparatus 204, which cause injection molding apparatus 204 to coinject layers 122, 124, and 126 into mold cavity 208.

In some embodiments, controller 202 includes a communications interface 228 and a processing circuit 222. Communications interface 228 can be or include wired or wireless interfaces (e.g., jacks, antennas, transmitters, receivers, transceivers, wire terminals, etc.) for conducting electronic data communications. For example, communications interface 228 may be used to conduct data communications with injection molding apparatus 204, camera 206, a user device, and/or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 228 can include an Ethernet card and port for sending and receiving data via an Ethernet-based communications link or network. In another example, communications interface 228 can include a Wi-Fi transceiver or a cellular or mobile phone transceiver for communicating via a wireless communications network.

Processing circuit 222 is shown to include a processor 224 and memory 226. Processor 224 can be implemented as a general purpose processor, an application specific integrated circuit (ASIC), one or more field programmable gate arrays (FPGAs), a group of processing components, a microcontroller, or other suitable electronic processing components. Memory 226 (e.g., memory device, memory unit, storage device, etc.) may be one or more devices (e.g., RAM, ROM, solid state memory, hard disk storage, etc.) for storing data and/or computer code for completing or facilitating the various processes and control activities described herein. Memory 226 may be or include volatile memory or non-volatile memory. Memory 226 may include database components, object code components, script components, or any other type of information structure for supporting the various activities and information structures described herein. According to an exemplary embodiment, memory 226 is communicably connected to processor 224 via processing circuit 222 and includes computer code for executing (e.g., by processing circuit 222 and/or processor 224) one or more processes or control activities described herein.

Injection molding apparatus 204 can include any of a variety of injection molding machinery configured to coinject multiple polymeric materials into mold cavity 208. Suitable injection molding machinery include, for example, the injection molding machinery manufactured by Husky Injection Molding Systems Ltd. of Bolton, Canada. Coinjection molding generally includes the injection of multiple polymeric materials into a single mold cavity or multiple mold cavities, either simultaneously or sequentially, and results in a layered wall structure, as described with reference to FIGS. 7-9. Several examples of coinjection molding apparatuses and coinjection molding techniques are described in detail in U.S. Pat. No. 4,717,324 titled "Coinjection of Hollow Articles and Preforms," U.S. Pat. No. 4,775,308 titled "Nozzle for Coinjection of Hollow Articles and Preforms," U.S. Pat. No. 4,808,101 titled "Tri-Injection of Hollow Articles," U.S. Pat. No. 6,276,914 titled "Multiple Gating Nozzle," and U.S. Pat. No. 7,462,319 titled "Injection Molding Machine Apparatus and Method With Moving Platen Injection and Ejection Actuation." The entire disclosure of each of these patents is incorporated by reference herein.

Figure 12:
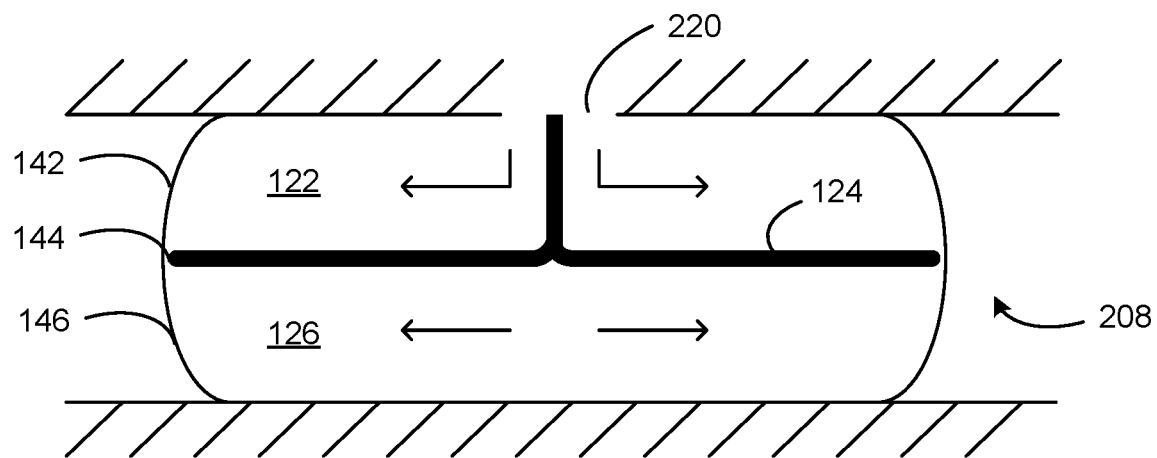
FIG. 12 is a cross-section of a mold cavity showing a plurality of layers of the multi-layer container flowing through the mold cavity during coinjection, according to an exemplary embodiment.

As shown in FIG. 12, injection molding apparatus 204 can coinject layers 122, 124, and 126 into mold cavity 208 via gate 220, which may be located at the center point 112 of base 102. Layers 122-126 flow radially outward from gate 220 and fill mold cavity 208. Each of layers 122-126 is shown to include a leading edge 142-146. Leading edge 142 is the leading edge of inner layer 122; leading edge 144 is the leading edge of barrier layer 124; and leading edge 146 is the leading edge of outer layer 126. Injection molding apparatus 204 can control the positions of leading edges 142 and 146 by adjusting the flow of the first polymeric material that forms inner layer 122 and outer layer 126. Similarly, injection molding apparatus 204 can control the position of leading edge 144 by adjusting the flow of the second polymeric material that forms barrier layer 124.

Figure 13:
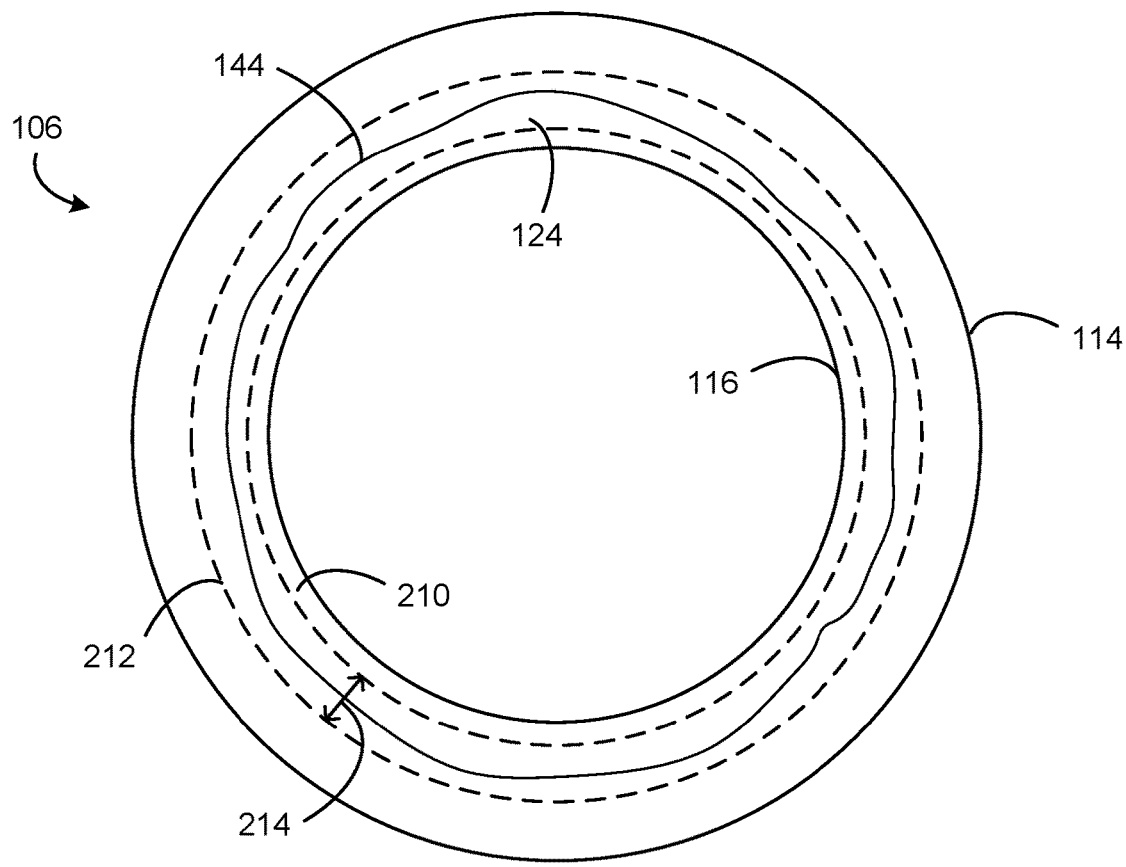
FIG. 13 is an illustration of an image which can be captured by a camera during coinjection and used by a controller of the molding control system of FIG. 11 to determine when to stop injecting the barrier layer, according to an exemplary embodiment.

Referring now to FIG. 13, camera 206 can monitor the position of barrier layer 124 during coinjection and can provide images of the position of barrier layer 124 to controller 202. In some embodiments, camera 206 is positioned relative to mold cavity 208 such that camera 206 can capture images of flange 106 while layers 122-126 are coinjected into mold cavity 208. FIG. 13 shows an example of an image that can be captured by camera 206. The leading edge 144 of barrier layer 124 is shown within flange 106. In some embodiments, the flow of barrier layer 124 within mold cavity 208 is non-uniform, which results in a non-uniform leading edge 144 of barrier layer 124.

Controller 202 can use the images from camera 206 to identify the position of the leading edge 144 of barrier layer 124 and can determine when leading edge 144 has reached a threshold location. When the position of leading edge 144 reaches the threshold location, controller 202 can provide a control signal to injection molding apparatus 204 to cause injection molding apparatus 204 to stop injecting barrier layer 124 into mold cavity 208. In this way, controller 202 can precisely control the location at which barrier layer 124 ends within the multi-layer wall structure that forms container 100.

In some embodiments, camera 206 actively monitors the location of barrier layer 124 during molding and provides a feedback signal to controller 202. Controller 202 can use the feedback signal in a closed loop control process to control injection molding apparatus 204. In other embodiments, camera 206 inspects the location of barrier layer 124 after molding is complete. Controller 202 can accept or reject each coinjection molded container 100 based on the locations of barrier layer 124. Controller 202 can be configured to trigger an alarm if a threshold number or percentage of containers 100 are rejected. In some embodiments, controller 202 can automatically adjust the timing of the coinjection molding process to control the final location of barrier layer 124. For example, controller 202 can cause barrier layer 124 to be injected for a longer amount of time or can adjust the time at which barrier layer 124 is injected relative to inner layer 122 and/or outer layer 126 to control the final location at which barrier layer 124 ends within injection molded container 100.

In some embodiments, the threshold location results in barrier layer 124 covering less than 95% the total surface area of container 100 through which oxygen or other gasses can permeate through the layered wall structure. For example, the threshold location can be defined as a predetermined location within side wall 104, upper shoulder 108, neck 120, and/or flange 106. In some embodiments, the threshold location is at or near the intersection of flange 106 and neck 120 (e.g., near inner rim 116). In some embodiments, the threshold location within flange 106 proximate inner rim 116 such that the flow barrier layer 124 is stopped shortly after barrier layer 124 enters flange 106.

Referring now to FIG. 13, a drawing of an image which can be captured by camera 206 is shown, according to an exemplary embodiment. FIG. 13 shows two thresholds 210 and 212 within flange 106. Threshold 210 is defined by a first circle proximate inner rim 116, whereas threshold 212 is defined by a second circle closer to outer rim 114 and having a larger radius than the first circle. The annular region between thresholds 210 and 212 defines a threshold zone 214.

In some embodiments, controller 202 determines that leading edge 144 has reached the threshold location when any part of leading edge 144 crosses threshold 210. Defining the threshold location in this way will cause controller 202 to stop the flow of barrier layer 124 when any part of leading edge 144 is within threshold zone 214, even if some parts of leading edge 144 have not yet reached threshold zone 214. In other embodiments, controller 202 determines that leading edge 144 has reached the threshold location when all of leading edge 144 has crossed threshold 210. Defining the threshold location in this way will ensure that all of leading edge 144 is within threshold zone 214 or has past threshold zone 214 before controller 202 stops the flow of barrier layer 124.

In some embodiments, controller 202 determines that leading edge 144 has reached the threshold location when any part of leading edge 144 crosses threshold 210. Defining the threshold location in this way will cause controller 202 to stop the flow of barrier layer 124 when any part of leading edge 144 has past threshold zone 214, even if some parts of leading edge 144 have not yet reached threshold 212. In other embodiments, controller 202 determines that leading edge 144 has reached the threshold location when all of leading edge 144 has crossed threshold 212. Defining the threshold location in this way will ensure that all of leading edge 144 has past threshold zone 214 before controller 202 stops the flow of barrier layer 124.

In some embodiments, controller 202 determines that leading edge 144 has reached the threshold location based on an average location of leading edge 144. For example, controller 202 can determine the radial distance of leading edge 144 relative to inner rim 116 and/or outer rim 114 at a plurality of positions along leading edge 144. Due to non-uniform flow, leading edge 144 may have a different distance relative to inner rim 116 and/or outer rim 114 at different positions along leading edge 144. Controller 202 can calculate an average location of leading edge 144 by averaging the plurality of distances. Controller can determine that leading edge 144 has reached the threshold location if the average distance of leading edge 144 has crossed threshold 210, threshold 212, or is within threshold zone 214.

Although leading edge 144 is shown as having a non-uniform position in FIG. 13 (i.e., some points along leading edge 144 are located closer to inner rim 116 or outer rim 114 than other points along leading edge 144), it is contemplated that molding control system 200 can control the flow of barrier layer 124 to reduce variance in the position of leading edge 144. For example, molding control system 200 can control the flow of barrier layer 124 such that all points along leading edge 144 are within 10% of the average position of leading edge 144, or preferably within 5% of the average position of leading edge 144. In other words, the position of any given point along leading edge 144 may be within 10% or preferably within 5% of the average position of leading edge 144.

In some embodiments, controller 202 determines the location of barrier layer 124 after injection molding is complete and can accept or reject finished containers 100 based on the location of barrier layer 124. If the location of barrier layer 124 does not satisfy the threshold conditions, controller 202 can trigger an alarm and/or automatically adjust the injection molding process (e.g., by changing injection timing, etc.) such that future injection molded containers 100 satisfy the threshold conditions.

Molding Process

Figure 14:
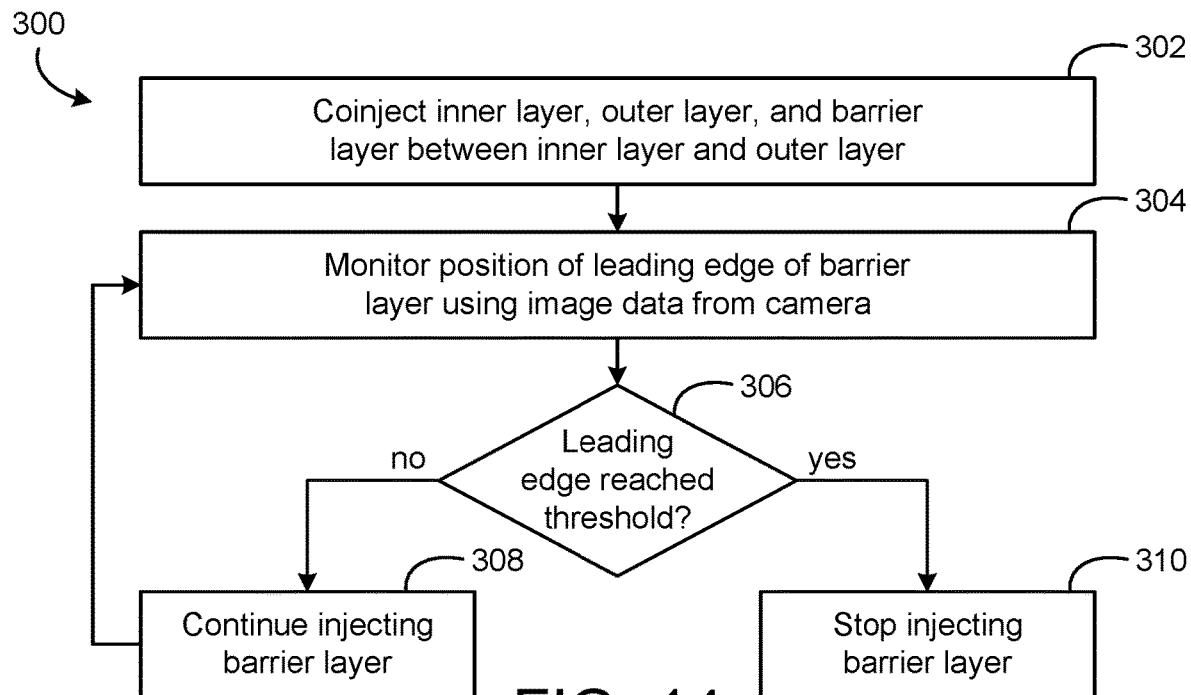
FIG. 14 is a flowchart of a process which can be performed by the molding control system of FIG. 11 to actively monitor and control the coinjection of the container of FIG. 1 while the coinjection is being performed, according to an exemplary embodiment.

Referring now to FIG. 14, a flowchart of a process 300 for monitoring and controlling the coinjection of container 100 is shown, according to an exemplary embodiment. Process 300 can be performed by one or more components of molding control system 200, as described with reference to FIGS. 11-13. Process 300 is feedback control process for actively monitoring and controlling the coinjection of container 100 while container 100 is being coinjected into mold cavity 208.

Process 300 is shown to include coinjecting an inner layer, outer layer, and barrier layer between the inner layer and outer layer (step 302). In some embodiments, the inner layer is inner layer 122, the barrier layer is barrier layer 124, and the outer layer is outer layer 126, as previously described. Layers 122-126 can be coinjected into mold cavity 208, as shown in FIG. 12. Layers 122-126 may flow through mold cavity 208 forming container 100.

Process 300 is shown to include monitoring the position of a leading edge of the barrier layer using image data from a camera (step 304). The leading edge may be leading edge 144 of barrier layer 124, as previously described. In some embodiments, step 304 includes capturing images of container 100 while step 302 is being performed. For example, camera 206 can be used to capture images of flange 106 that show the position of barrier layer 124, and particularly the position of leading edge 144, within flange 106. Step 304 may include providing the images from camera 206 to controller 202.

Process 300 is shown to include determining whether the leading edge has reached a threshold location (step 306). Step 306 can be performed by controller 202 using the images captured by camera 206. In some embodiments, step 306 includes determining whether some or all of leading edge 144 has crossed a predetermined threshold, as described with reference to FIG. 13. In some embodiments, the threshold is the location at which neck 120 intersects flange 106. In some embodiments, the threshold is a ring or circle defining a predetermined location within flange 106 (i.e., between inner rim 116 and outer rim 114). Examples of such thresholds include thresholds 210-212, shown in FIG. 13. In some embodiments, the threshold is an annular region defining a threshold zone 214 between two thresholds 210-212.

In response to a determination that the leading edge 144 of barrier layer 124 has reached the threshold location (i.e., the result of step 306 is "yes"), controller 202 may provide a control signal to injection molding apparatus 204, causing injection molding apparatus 204 to stop injecting barrier layer 124 (step 310). Performing step 310 may cause barrier layer 124 to stop advancing within mold cavity 208 upon reaching the threshold location. Injection molding apparatus 204 may continue injecting inner layer 122 and outer layer 126 to fill any remaining volume within mold cavity 208.

In response to a determination that the leading edge 144 of barrier layer 124 has not yet reached the threshold location (i.e., the result of step 306 is "no"), controller 202 may cause injection molding apparatus 204 to continue injecting barrier layer 124 (step 308) and process 300 may return to step 304. Steps 304-308 may be repeated until controller 202 determines that leading edge 144 of barrier layer 124 has reached the threshold location in step 306, at which point process 300 advances to step 310.

Figure 15:
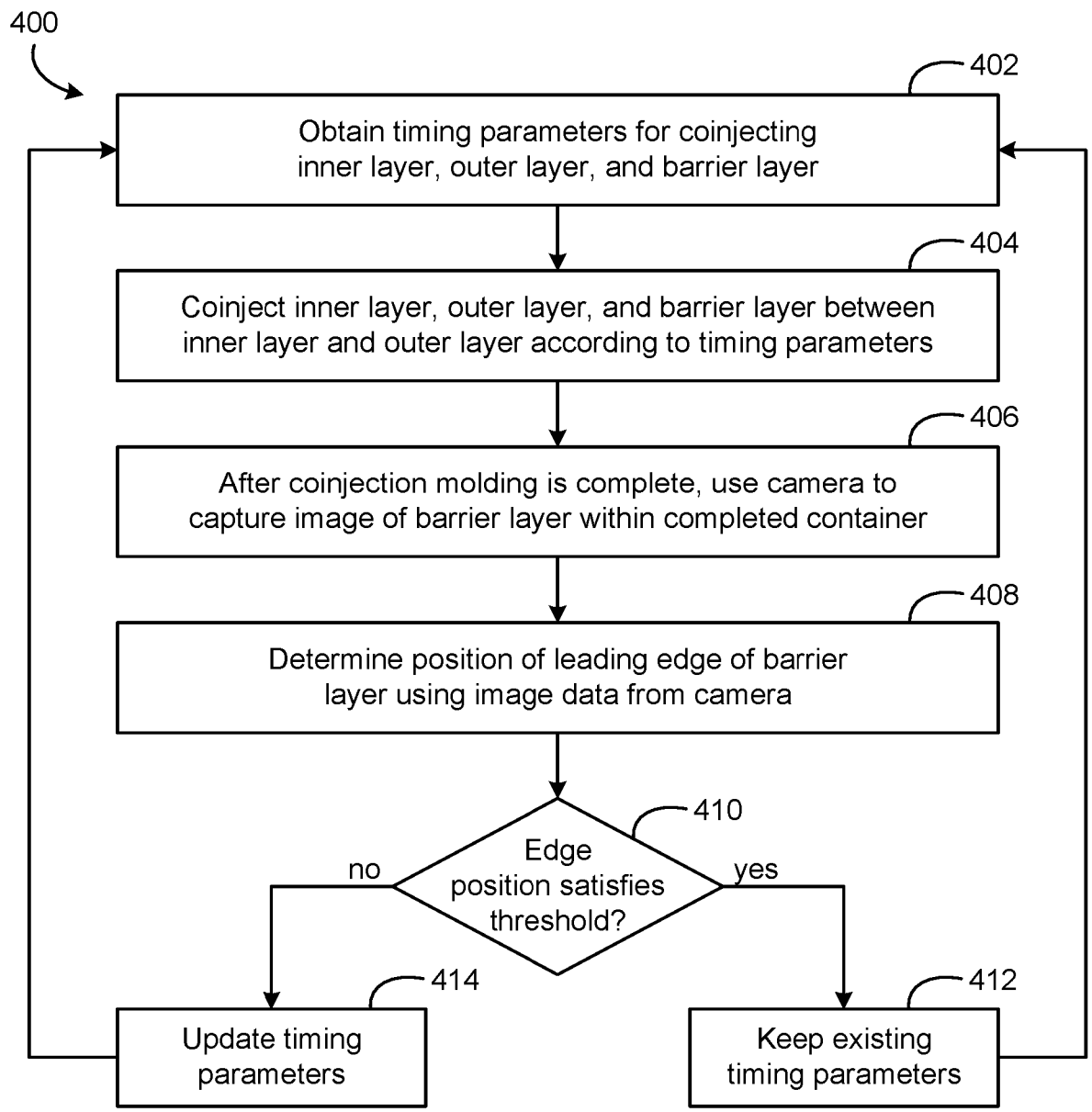
FIG. 15 is a flowchart of a process which can be performed by the molding control system of FIG. 11 to adjust timing parameters used to control the coinjection of the container of FIG. 1 after the coinjection is complete, according to an exemplary embodiment.

Referring now to FIG. 15, a flowchart of another process 400 for monitoring and controlling the coinjection of container 100 is shown, according to an exemplary embodiment. Process 400 can be performed by one or more components of molding control system 200, as described with reference to FIGS. 11-13. Unlike process 300, process 400 does not actively monitor and control the coinjection of container 100 while container 100 is being coinjected into mold cavity 208. Rather, process 400 inspects a first coinjection molded container 100 and uses the position of barrier layer 124 within the first coinjection molded container 100 to adjust coinjection timing parameters that control the coinjection molding of future containers 100.

Process 400 is shown to include obtaining timing parameters for coinjecting inner layer 122, outer layer 126, and barrier layer 124 (step 402). The timing parameters may indicate when to start injecting each layer, when to stop injecting each layer, and/or a time offset between the times at which the layers are injected. The timing parameters may define which of layers 122-126 that injection molding apparatus 204 begins injecting first and/or an amount of time that injection molding apparatus 204 waits before starting to coinject the other layers 122-126. Once the timing parameters have been obtained, controller 202 can coinject inner layer 122, outer layer 126, and barrier layer 124 between inner layer 122 and outer layer 126 according to the timing parameters (step 404). Layers 122-126 can be coinjected into mold cavity 208, as shown in FIG. 12. Layers 122-126 may flow through mold cavity 208 forming container 100.

After the coinjection molding is complete and container 100 has been fully formed, controller 202 can use camera 206 to capture an image of barrier layer 124 within the completed container 100 (step 406). For example, camera 206 can be used to capture an image of flange 106 that shows the position of barrier layer 124, and particularly the position of leading edge 144, within flange 106. Step 406 may include providing the image from camera 206 to controller 202. Controller 202 can use the image data from camera 206 to determine a position of leading edge 144 of barrier layer 124 (step 408).

Process 400 is shown to include determining whether the position of leading edge 144 satisfies a threshold (step 410). Step 410 can be performed by controller 202 using the image captured by camera 206. In some embodiments, step 410 includes determining whether some or all of leading edge 144 has crossed a predetermined threshold, as described with reference to FIG. 13. In some embodiments, the threshold is the location at which neck 120 intersects flange 106. In some embodiments, the threshold is a ring or circle defining a predetermined location within flange 106 (i.e., between inner rim 116 and outer rim 114). Examples of such thresholds include thresholds 210-212, shown in FIG. 13. In some embodiments, the threshold is an annular region defining a threshold zone 214 between two thresholds 210-212. Controller 202 may determine that the position of leading edge 144 satisfies the threshold if the position of leading edge 144 has reached a threshold location or is within a threshold zone.

In some embodiments, step 410 includes determining whether the position of leading edge 144 satisfies the threshold for a plurality of completed containers 100. If the threshold is not satisfied for a particular container 100, controller 202 may reject that container 100 and increment a counter that tracks the number of rejected containers. While the number of rejected containers 100 is less than a predetermined number (e.g., three containers, five containers, ten containers, etc.), controller 202 may continue creating containers 100 using the current set of timing parameters. Once the number of rejected containers 100 reaches a predetermined number, controller 202 may proceed to step 414 (i.e., update the timing parameters) and may reset the counter to zero.

In response to a determination that the leading edge 144 of barrier layer 124 satisfies the threshold (i.e., the result of step 410 is "yes"), controller 202 may determine that the timing parameters used to control the coinjection molding process are producing acceptable containers 100. Accordingly, controller 202 may keep the existing timing parameters (step 412) such that future coinjection molded containers 100 are formed using the same timing parameters. Process 400 may then return to step 402 and may be repeated to form more containers 100.

In response to a determination that the leading edge 144 of barrier layer 124 does not satisfy the threshold (i.e., the result of step 410 is "no"), controller 202 may determine that the timing parameters used to control the coinjection molding process are not producing acceptable containers 100. Accordingly, controller 202 may update the timing parameters in order to adjust the position of the leading edge 144 of barrier layer 124 in future containers 100. For example, if the image from camera 206 indicates that leading edge 144 did not reach the threshold, controller 202 may adjust the timing parameters such that the coinjection of barrier layer 124 begins sooner or lasts longer in order to advance the position of leading edge 144 within future containers 100. Conversely, if the image from camera 206 indicates that leading edge 144 has crossed a maximum position threshold (i.e., leading edge 144 went too far), controller 202 may adjust the timing parameters such that the coinjection of barrier layer 124 begins later or lasts for less time in order to prevent leading edge 144 from traveling as far within future containers 100. Process 400 may then return to step 402 and may be repeated to form more containers 100.

In some embodiments, step 414 is performed automatically by controller 202. For example, controller 202 can automatically update the timing parameters used to control the coinjection molding process as described above. In other embodiments, step 414 is semi-manual. For example, controller 202 may output an indication that the timing parameters need to be updated to a human operator. In some embodiments, controller 202 also outputs a suggested update to the timing parameters for the human operator to accept or decline. The human operator may then update the timing parameters to control the position of leading edge 144. It is contemplated that the update performed in step 414 can be fully automatic, semi-automatic (e.g., automatic prompting a user to update the timing parameters), or fully manual in various embodiments.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

In the present disclosure, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for manufacturing an injection molded container, the method comprising:
   operating an injection molding apparatus to inject one or more polymeric materials into a mold cavity to form a container having an energy director ring protruding from an inside surface of the container and extending circumferentially along the inside surface; and
   welding a filter onto the inside surface by applying a welding force to the inside surface, the energy director ring causing the welding force to be concentrated at a location of the energy director ring, thereby forming a circumferential weld that secures the filter to the inside surface at the location of the energy director ring.

2. The method of claim 1, wherein:
   the container is a multi-layer container comprising an inner layer, an outer layer, and a barrier layer located between the inner layer and the outer layer;
   the one or more polymeric materials comprise a plurality of polymeric materials; and
   operating the injection molding apparatus comprises coinjection molding the plurality of polymeric materials into the mold cavity to form the multi-layer container.

3. The method of claim 2, wherein:
   the plurality of polymeric materials comprise a first polymeric material and a second polymeric material less permeable to gas than the first polymeric material;
   the inner layer comprises the first polymeric material and forms the inside surface of the container;
   the outer layer comprises the first polymeric material and forms an outside surface of the container; and
   the barrier layer comprises the second polymeric material.

4. The method of claim 2, further comprising:
   using a camera to capture images indicating a location of the barrier layer within the multi-layer container;
   comparing the location of the barrier layer to a threshold location; and
   adjusting an operation of the injection molding apparatus based on the location of the barrier layer relative to the threshold location.

5. The method of claim 1, wherein the container comprises:
   a base defining a bottom of the container;
   a side wall forming a side surface of the container and having a lower rim coupling the side wall to a perimeter of the base; and an upper shoulder coupled to an upper rim of the side wall and extending radially outward from the side wall and away from the base.

6. The method of claim 5, wherein:

the side wall comprises a substantially linear cross-section extending from the upper shoulder to the lower rim; and the energy director ring is located along the substantially linear cross-section between the upper shoulder and the lower rim, thereby causing the circumferential weld to form along the substantially linear cross-section between the upper shoulder and the lower rim.

7. The method of claim 1, wherein the container comprises:

a side wall forming a side surface of the container and having an upper rim;

a flange coupled to the upper rim of the side wall and extending radially outward from the upper rim; and a second energy director ring protruding from an upper surface of the flange.

8. The method of claim 1, further comprising positioning the filter inside the container such that a gap exists between a base of the container and a base of the filter, the gap allowing the base of the filter to be punctured when the container is in use without puncturing the filter.

* * * * *